(12) United States Patent  
Munoz

(10) Patent No.: US 11,646,046 B2  
(45) Date of Patent: May 9, 2023

(54) PSYCHOACOUSTIC ENHANCEMENT BASED ON AUDIO SOURCE DIRECTIVITY

(71) Applicant: QUALCOMM Incorporated, San Diego, CA (US)

(72) Inventor: Isaac Garcia Munoz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 16 days.

(21) Appl. No.: 17/162,241

(22) Filed: Jan. 29, 2021

(65) Prior Publication Data

US 2022/0246160 A1     Aug. 4, 2022

(51) Int. Cl.
*G10L 21/0208* (2013.01)
*G10L 17/00* (2013.01)
(Continued)

(52) U.S. Cl.
CPC .......... *G10L 21/0208* (2013.01); *G10L 17/00* (2013.01); *G10L 25/51* (2013.01); *H04R 3/04* (2013.01)

(58) Field of Classification Search
CPC ..... G10L 21/0208; G10L 17/00; G10L 25/51; G10L 19/00; G10L 19/008; H04R 3/00; H04R 3/04; H04R 3/005; H04R 3/12; H04R 1/406; H04R 1/403; H04R 2499/11; H04R 2499/13; H04R 2499/15; G06F 3/165; G06F 3/011; G06F 3/012; G06F 3/01; H04S 7/30; H04S 7/301; H04S 7/303; H04S 7/304; H04S 7/307; H04S 7/00; H04N 5/23216; H04N 5/232; H04N 5/232933; H04N 5/232935; H04N 5/23296

USPC .... 704/200, 200.1, 201, 205, 202, 203, 211, 704/219, 220, 221, 225, 226, 231, 233, 704/235, 236, 237, 238, 240, 243, 244, 704/245, 246, 251; 381/92, 91, 26, 56, 381/57, 61, 312–321, 71.1–71.14, 73.1,
(Continued)

(56) References Cited

U.S. PATENT DOCUMENTS 8,319,858 B2     11/2012 Zhang et al.
2010/0189275 A1*   7/2010 Christoph .............. H04R 3/005
                                                     381/86
(Continued)

FOREIGN PATENT DOCUMENTS

JP     2003337164 A   *  11/2003   ............... H04R 3/00
WO    2019204214 A2     10/2019

OTHER PUBLICATIONS

Tylka et al "On the Calculation of Full ad Partial Directivity Indices", 3D Audio and Applied Acoustics Lab.—Princeton University, p. 1-12 (Year: 2014).*
(Continued)

*Primary Examiner* — Leshui Zhang
(74) *Attorney, Agent, or Firm* — Moore IP

(57) ABSTRACT

A device includes a memory configured to store directivity data of one or more audio sources corresponding to one or more input audio signals. The device also includes one or more processors configured to determine one or more equalizer settings based at least in part on the directivity data. The one or more processors are also configured to generate, based on the equalizer settings, one or more output audio signals that correspond to a psychoacoustic enhanced version of the one or more input audio signals.

30 Claims, 13 Drawing Sheets

(51) Int. Cl.
  *G10L 25/51*  (2013.01)
  *H04R 3/04*  (2006.01)
  *G06F 3/01*  (2006.01)
  *H04S 7/00*  (2006.01)
  *H04R 3/00*  (2006.01)

(58) Field of Classification Search
  USPC ............... 381/74, 94.1–94.4, 94.5–94.9, 95, 381/97–103, 111, 112, 113, 114, 115, 381/122, 119; 700/94
  See application file for complete search history.

(56) References Cited

U.S. PATENT DOCUMENTS

| | | | |
|---|---|---|---|
| 2013/0342731 A1 | 12/2013 | Lee et al. | |
| 2017/0099458 A1* | 4/2017 | Johnson | H04S 7/305 |
| 2019/0132685 A1* | 5/2019 | Skoglund | H04R 25/405 |
| 2021/0118452 A1* | 4/2021 | Tsingos | G10L 19/008 |

OTHER PUBLICATIONS

Wagner "NIST System for Measuring the Directivity Index of Hearing Aids under Simulated Real-Ear Conditions", vol. 118 (2013), J. of Research of the National Institute of Standards and Technology, p. 105-124 (Year: 2013).*

Tylka et al "On the Calculation of Full and Partial Directivity Indices", 3D Audio and Applied Acoustics Lab.—Princeton University, p. 1-12 (Year: 2014).*

Chu et al., "Detailed Directivity of Sound Fields Around Human Talkers", IRC-RR-104, Dec. 2002, https://doi.org/10.4224/20378930, pp. 1-49.

Brixen, "Near field registration of the human voice: Spectral changes due to positions", AES Presented at the 104th Convention May 16-19, 1998 Amsterdam, pp. 1-20.

Hak et al., "The Source Directivity of a Dodecahedron Sound Source determined by Stepwise Rotation", Forum Acusticum, Jun. 27-Jul. 1, 2011, Aalborg, (c) European Acoustics Association, ISBN: 978-84-694-1520-7, ISSN: 221-3767, pp. 1875-1879.

Facts about speech intelligibility: human voice frequency range, Copyright 2020, DPA Microphones, Inc., https://www.dpamicrophones.com/mic-university/facts-about-speech-intelligibility, printed Jan. 26, 2021, pp. 1-17.

Brusi J., "A Game of Numbers (Understanding Directivity Specifications)", Brusi Acoustical Consulting, Sound and Video Contractor Magazine (USA), Apr. 1999, Updated Version Jan. 2010, pp. 1-7.

International Search Report and Written Opinion—PCT/US2021/072989—ISA/EPO—dated Apr. 4, 2022, pp. 1-12.

Lee T., et al., "An Object-Based 3D Audio Broadcasting System for Interactive Service", Audio Engineering Society Convention Paper, New York, NY, US, No. 63842, May 8, 2005 (May 28, 2005), pp. 1-8, XP002577516, Retrieved from the Internet: URL: http://www.aes.org/tmpFiles/elib/20100413/13100.pdf [retrieved on Apr. 12, 2010] pp. 1-3, 6.

Schultz-Amling R., et al., "Acoustical Zooming Based on a Parametric Sound Field Representation", 128th Audio Engineering Society Convention 2010 : London, United Kindom, May 22-25, 2010 (AES Convention 128), Audio Engineering Society, GB, May 22, 2010 (May 22, 2010), XP008180938, 60 East 42nd Street, Room 2520 New York 10165-2520, USA, May 1, 2010 (May 1, 2010), XP040509503, p. 1-p. 7, pp. 1310-1318.

* cited by examiner

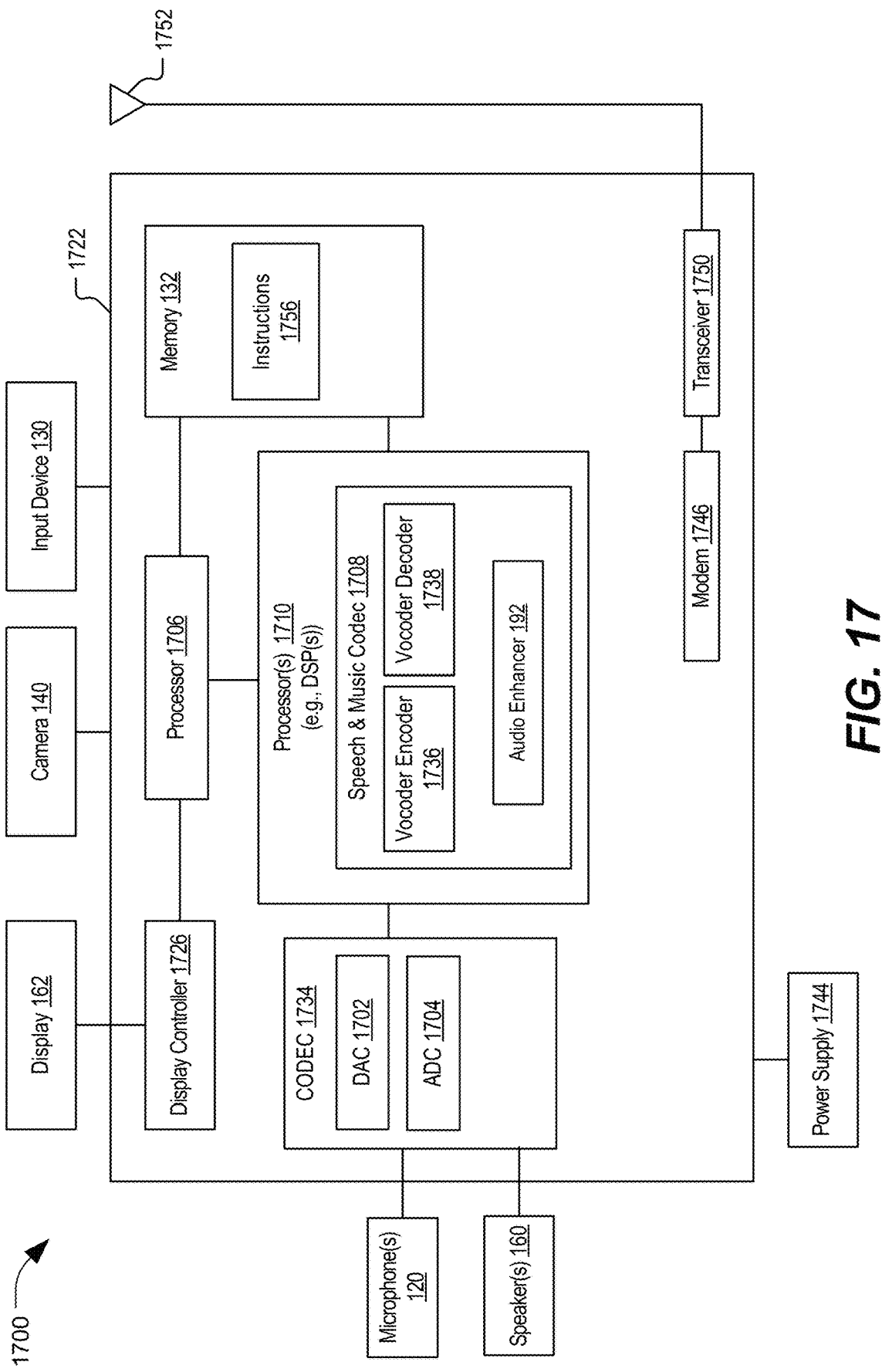

PSYCHOACOUSTIC ENHANCEMENT BASED ON AUDIO SOURCE DIRECTIVITY

I. FIELD

The present disclosure is generally related to psychoacoustic enhancement based on audio source directivity.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices often incorporate functionality to receive an audio signal from one or more microphones. For example, the audio signal may represent user speech captured by the microphones, ambient sounds captured by the microphones, or a combination thereof. The user speech may be difficult to hear in the audio signal because of the distance of the microphones from a user whose user speech is captured by the microphones. For example, microphones that are further away from the user may capture more ambient sounds, such as traffic, speech of other users, etc. As another example, the user speech sounds softer when captured by microphones that are further away. The ability to focus on particular sounds in an audio signal is useful for various applications, such as to more clearly communicate user speech in a communication application or a voice-controlled assistant system.

III. SUMMARY

According to one implementation of the present disclosure, a device includes a memory configured to store directivity data of one or more audio sources corresponding to one or more input audio signals. The device also includes one or more processors configured to determine one or more equalizer settings based at least in part on the directivity data. The one or more processors are also configured to generate, based on the equalizer settings, one or more output audio signals that correspond to a psychoacoustic enhanced version of the one or more input audio signals.

According to another implementation of the present disclosure, a method includes obtaining, at a device, directivity data of one or more audio sources corresponding to one or more input audio signals. The method also includes determining, at the device, one or more equalizer settings based at least in part on the directivity data. The method further includes generating, based on the equalizer settings, one or more output audio signals that correspond to a psychoacoustic enhanced version of the one or more input audio signals.

According to another implementation of the present disclosure, a non-transitory computer-readable medium stores instructions that, when executed by one or more processors, cause the one or more processors to obtain directivity data of one or more audio sources corresponding to one or more input audio signals. The instructions, when executed by the one or more processors, also cause the one or more processors to determine one or more equalizer settings based at least in part on the directivity data. The instructions, when executed by the one or more processors, also cause the one or more processors to generate, based on the equalizer settings, one or more output audio signals that correspond to a psychoacoustic enhanced version of the one or more input audio signals.

According to another implementation of the present disclosure, an apparatus includes means for obtaining directivity data of one or more audio sources corresponding to one or more input audio signals. The apparatus also includes means for determining one or more equalizer settings based at least in part on the directivity data. The apparatus further includes means for generating, based on the equalizer settings, one or more output audio signals that correspond to a psychoacoustic enhanced version of the one or more input audio signals.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

FIG. 17 is a block diagram of a particular illustrative example of a device that is operable to perform psychoacoustic enhancement based on audio source directivity, in accordance with some examples of the present disclosure.

V. DETAILED DESCRIPTION

Microphones generate audio signals representing captured sound, such as user speech, ambient sounds, or a combination thereof. Various sounds may be difficult to hear in the audio signal because of the distance of the microphones from an audio source. The ability to focus on particular sounds in the audio signal is useful for various applications, such as user speech in a communication application or bird sounds in a bird tracking application.

Systems and methods of psychoacoustic enhancement based on audio source directivity are disclosed. Different types of audio sources can have different sound directivity characteristics. For example, human speech is directed more in front of the human head than behind, and may exhibit a frequency response that varies based on a distance and angular offset from the direction the human speaker is facing, while a dodecahedron sound source approximates omnidirectional directivity.

An audio enhancer performs psychoacoustic enhancement based on directivity of an audio source to approximate sound that would be captured by moving the microphone relative to (e.g., closer to or away from) the audio source. For example, the audio enhancer includes a directivity analyzer and an equalizer. The directivity analyzer generates equalizer settings based on directivity data of an audio source and a zoom target. For example, the directivity analyzer generates the equalizer settings such that applying the equalizer settings adjusts loudness of particular audio frequencies to emulate moving a microphone to the zoom target. The equalizer applies the equalizer settings to input audio signals to generate output audio signals that correspond to a psychoacoustic enhanced version of the input audio signals. For example, the input audio signals are based on microphone outputs of microphones and the output audio signals approximate a frequency response of the audio source at the zoom target. The output audio signals thus approximate sounds that would be captured by the microphones at the zoom target.

Figure 1:
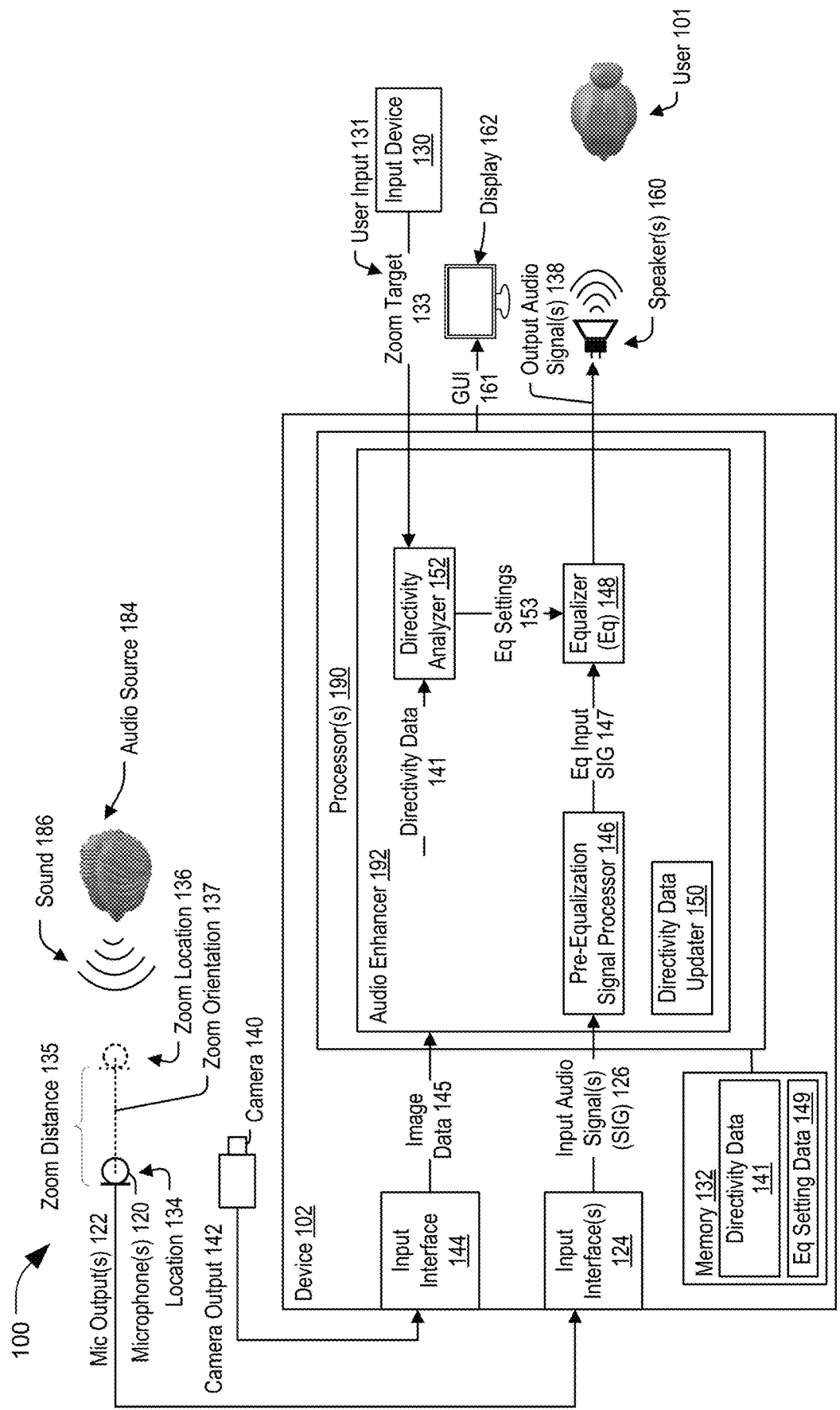
FIG. 1 is a block diagram of a particular illustrative aspect of a system operable to perform psychoacoustic enhancement based on audio source directivity, in accordance with some examples of the present disclosure.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more processors ("processor(s)" 190 of FIG. 1), which indicates that in some implementations the device 102 includes a single processor 190 and in other implementations the device 102 includes multiple processors 190.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system configured to perform psychoacoustic enhancement based on audio source directivity is disclosed and generally designated 100. The system 100 includes a device 102 that is coupled to one or more microphones 120, a camera 140, one or more speakers 160, a display device 162, an input device 130, or a combination thereof. In some implementations, the display device 162 includes the input device 130 (e.g., a touchscreen).

The device 102 includes one or more processors 190 coupled to a memory 132. The memory 132 is configured to store equalizer (Eq) setting data 149, directivity data 141, other data used or generated by an audio enhancer 192, or a combination thereof. In a particular aspect, the one or more processors 190 are coupled via one or more input interfaces 124 to the one or more microphones 120. For example, the one or more input interfaces 124 are configured to receive one or more microphone outputs 122 from the one or more microphones 120 and provide the one or more microphone outputs 122 to the audio enhancer 192 as one or more input audio signals (SIG) 126.

In a particular aspect, the one or more processors 190 are coupled via an input interface 144 to the camera 140. For example, the input interface 144 is configured to receive a camera output 142 from the camera 140 and provide the camera output 142 to the audio enhancer 192 as image data 145. In a particular aspect, the input interface 144 is configured to provide the camera output 142 to the audio enhancer 192 concurrently with the one or more input interfaces 124 providing the image data 145 to the audio enhancer 192.

The device 102 is configured to perform psychoacoustic enhancement based on audio source directivity using the audio enhancer 192 included in the one or more processors 190. The audio enhancer 192 includes a directivity analyzer 152 coupled to an equalizer 148 and a pre-equalization signal processor 146 coupled to the equalizer 148. According to some implementations, a directivity data updater 150 is included in the audio enhancer 192.

The input device 130 is configured to provide a user input 131 indicating a zoom target 133 to the device 102. The directivity analyzer 152 is configured to generate equalizer settings 153 based on the directivity data 141, the zoom target 133, the equalizer setting data 149, or a combination thereof. For example, the directivity analyzer 152 is configured to generate the equalizer settings 153 such that applying the equalizer settings 153 adjusts loudness of particular audio frequencies to emulate moving the one or more microphones 120 closer to the zoom target 133.

The equalizer 148 is configured to apply the equalizer settings 153 to one or more equalizer input audio signals 147 to generate one or more output audio signals 138. In a particular aspect, the one or more equalizer input audio signals 147 include the one or more input audio signals 126. In an alternative implementation, the pre-equalization signal processor 146 is configured to process the one or more input audio signals 126 to generate the one or more equalizer input audio signals 147, as further described with reference to FIG. 3.

In some implementations, the device 102 corresponds to or is included in one or various types of devices. In an illustrative example, the processor 190 is integrated in a headset device that includes the one or more speakers 160, such as described further with reference to FIG. 9. In other examples, the processor 190 is integrated in at least one of a mobile phone or a tablet computer device, as described with reference to FIG. 8, a wearable electronic device, as described with reference to FIG. 10, a voice-controlled speaker system, as described with reference to FIG. 11, a camera device, as described with reference to FIG. 12, or a virtual reality headset or an augmented reality headset, as described with reference to FIG. 13. In another illustrative example, the processor 190 is integrated into a vehicle that also includes the one or more speakers 160, such as described further with reference to FIG. 14 and FIG. 15.

During operation, the one or more microphones 120 capture sound 186 from one or more audio sources including an audio source 184 (e.g., a person) and generate one or more microphone outputs 122 representing the sound 186. In a particular aspect, the one or more audio sources include a person, an animal, a bird, a vehicle, a musical instrument, another type of audio source, or a combination thereof. The one or more input interfaces 124 provide the one or more microphone outputs 122 to the audio enhancer 192 as the one or more input audio signals 126.

In a particular implementation, the camera 140 captures images (e.g., a video, still images, or both) of the one or more audio sources, such as the audio source 184, and generates a camera output 142 representing the images. In this implementation, the input interface 144 provides the camera output 142 to the audio enhancer 192 as image data 145. In a particular aspect, the camera 140 provides the camera output 142 to the device 102 concurrently with the one or more microphones 120 providing the one or more microphone outputs 122 to the device 102.

In a particular implementation, the image data 145, the one or more input audio signals 126, or a combination thereof, corresponds to stored data, such as video game data or previously recorded data, instead of corresponding to data captured via external sensors (e.g., the microphone 120 and the camera 140). For example, the audio enhancer 192 retrieves the image data 145, the one or more input audio signals 126, or a combination thereof, from the memory 132.

The one or more processors 190 generate the one or more output audio signals 138 based on the one or more input audio signals 126 and outputs the one or more output audio signals 138 via the one or more speakers 160. In a particular implementation, the one or more processors 190 generate a graphical user interface 161 based on the image data 145 and provide the graphical user interface 161 to the display device 162 to display images captured by the camera 140 to a user 101 concurrently with outputting the one or more output audio signals 138 via the one or more speakers 160.

The device 102 is responsive to the user 101 to initiate an audio zoom operation. For example, the user 101 uses the input device 130 to provide a user input 131 indicating a zoom target 133 to the audio enhancer 192. In a particular implementation, the user 101 uses the input device 130 (e.g., a mouse, a keyboard, a button, a slider input, or a combination thereof) to move a zoom selector displayed in the graphical user interface 161 to select the zoom target 133, as further described with reference to FIGS. 2A-2B. In another implementation, the user 101 initiates the audio zoom operation independently of the graphical user interface 161. For example, the one or more processors 190 provide the one or more output audio signals 138 to the one or more speakers 160 independently of providing any GUI to the display device 162. The user 101 uses the input device 130 (e.g., arrow keys on a keyboard, buttons on a headset, etc.) to provide the user input 131 indicating the zoom target 133 to the audio enhancer 192. To illustrate, the user 101 uses the input device 130 to zoom to different areas of a sound field corresponding to audio output of the one or more speakers 160, as further described with reference to FIG. 9.

The zoom target 133 includes information indicative of how an audio zoom is to be performed. In various implementations, the zoom target 133 can include or indicate a user's selection of at least one audio source (e.g., the audio source 184), a user's selection to adjust the audio in a manner that simulates moving the microphone 120, or a combination thereof, as further described with reference to FIGS. 4-6. For example, the zoom target 133 can include a user's selection of the audio source 184 and a zoom distance 135 indicating how much closer to the audio source 184 the one or more microphones 120 should be perceived as being located (e.g., 2 feet closer). In another example, the zoom target 133 can include a user's selection of the zoom distance 135 and a zoom orientation 137 indicating how much and in what direction the one or more microphones 120 should be perceived as having moved from a location 134 (e.g., a physical location). In a particular illustrative example, a first value (e.g., 0 degrees), a second value (e.g., 90 degrees), a third value (e.g., 180 degrees), or a fourth value (e.g., 270 degrees) of the zoom orientation 137 corresponds to a forward movement, a rightward movement, a backward movement, or a leftward movement, respectively, of the one or more microphones 120 relative to the location 134. In a particular example, such as when the user 101 selects the zoom distance 135 and the zoom orientation 137, the audio enhancer 192 determines a zoom location 136 by applying the zoom orientation 137 and the zoom distance 135 to the location 134 (of the one or more microphones 120. In another example, when the zoom target 133 includes a user's selection of the zoom location 136, the audio enhancer 192 determines the zoom orientation 137 and the zoom distance 135 based on a comparison of the location 134 and the zoom location 136. In a particular example, when the zoom target 133 includes a user's selection of the audio source 184, the audio enhancer 192 estimates a location of the audio source 184 and determines the zoom distance 135, the zoom location 136, the zoom orientation 137, or a combination thereof, based on the estimated location of the audio source 184. In a particular aspect, the audio enhancer 192 estimates the location of the audio source 184 using image analysis techniques, audio analysis techniques, position information of the audio source 184, or a combination thereof. In a particular aspect, the location 134 corresponds to a representative location (e.g., an average location) of locations of the plurality of microphones 120, and the zoom location 136 corresponds to a representative location (e.g., an average location) of locations to which the plurality of the microphones 120 are emulated as having moved.

The directivity analyzer 152 obtains the directivity data 141 of the one or more audio sources (e.g., the audio source 184) that correspond to the one or more input audio signals 126. For example, the directivity analyzer 152 identifies the audio source 184 (e.g., based on a type of source, such as from analyzing the input audio signal 126, analyzing the image data 145, or a combination thereof) and retrieves the directivity data 141 that most closely corresponds to the audio source 184 from the memory 132. In another example, the directivity analyzer 152 requests (e.g., downloads) the directivity data 141 from another device or network.

The directivity data 141 of a particular audio source indicates orientation and distance frequency response characteristics of the particular audio source. In a particular aspect, the directivity data 141 is associated with a generic audio source. For example, the directivity data 141 indicates the orientation and frequency response characteristics of a generic audio source. To illustrate, the directivity data 141 indicates that a frequency response, corresponding to mid-frequencies, changes (e.g., reduces or increases) by a first amount responsive to a change from a first distance relative to the generic audio source to a second distance relative to the generic audio source. In an alternative aspect, the directivity data 141 indicates directivity data associated with specific types of audio sources. For example, the directivity data 141 indicates frequency response changes of various frequencies responsive to changes in distance, orientation, or both, from a particular audio source type (e.g., a human talker, a bird, a musical instrument, etc.) of the audio source 184, as further described with reference to FIG. 4.

The directivity analyzer 152 determines equalizer settings 153 based at least in part on the directivity data 141, the zoom target 133, and equalizer setting data 149, as further described with reference to FIG. 4. For example, the directivity analyzer 152 generates the equalizer settings 153 such that applying the equalizer settings 153 adjusts loudness of particular audio frequencies to emulate moving the one or more microphones 120 to (or closer to) the zoom location 136. In a particular implementation, the directivity analyzer 152, in response to determining that directivity data for an audio source type of the audio source 184 is unavailable, selects the equalizer settings 153 based on default directivity data. To illustrate, the directivity analyzer 152 selects the equalizer settings 153 to adjust (e.g., increase or reduce) a frequency response corresponding to mid-frequencies (e.g., independently of an audio source type of the audio source 184. For example, the directivity analyzer 152 selects the equalizer settings 153 to increase loudness corresponding to mid-frequencies in response to determining that a distance between the zoom location 136 and the audio source 184 is less than a distance between the location 134 and the audio source 184. As another example, the directivity analyzer 152 selects the equalizer settings 153 to decrease loudness corresponding to mid-frequencies in response to determining that a distance between the zoom location 136 and the audio source 184 is greater than a distance between the location 134 and the audio source 184. In an alternative implementation, the directivity analyzer 152 selects the equalizer settings 153 based on the directivity (e.g., a frequency response) of an audio source type (e.g., a human talker or a bird) of the audio source 184 indicated by the directivity data 141, as further described with reference to FIG. 4. The directivity analyzer 152 provides the equalizer settings 153 to the equalizer 148.

The equalizer 148 generates the one or more output audio signals 138 by applying the equalizer settings 153 to one or more equalizer input audio signals 147. In a particular implementation, the one or more equalizer input audio signals 147 include the one or more input audio signals 126. In another implementation, the pre-equalization signal processor 146 generates the one or more equalizer input audio signals 147 by applying pre-equalization processing to the one or more input audio signals 126, as further described with reference to FIG. 3. The equalizer 148 provides the one or more output audio signals 138 to the one or more speakers 160.

The one or more output audio signals 138 correspond to a psychoacoustic enhanced version of the one or more input audio signals 126. The psychoacoustic enhanced version (e.g., the one or more output audio signals 138) approximates the frequency response of the audio source 184 at the zoom location 136 (e.g., the zoom orientation 137 and the zoom distance 135) associated with the audio zoom operation. The sound (corresponding to the one or more output audio signals 138) generated by the one or more speakers 160 thus emulates having moved the one or more microphones 120 to (or closer to) the zoom location 136.

In a particular implementation, the directivity data updater 150 generates or updates the directivity data 141. The directivity updater 150 is configured to sample and analyze audio captured at various distances and orientations from an audio source and generate, or update, directivity data associated with that audio source. In a particular example, the directivity data updater 150 generates, at a first time, a first sound spectrum of an input audio signal of the one or more input audio signals 126 corresponding to the audio source 184. The first sound spectrum represents sound captured by the one or more microphones 120 at a first distance from the audio source 184 when the audio source 184 has a first orientation relative to the one or more microphones 120. The directivity data updater 150 generates, at a second time, a second sound spectrum of an input audio signal of the one or more input audio signals 126 corresponding to the audio source 184. The second sound spectrum represents sound captured by the one or more microphones 120 at a second distance from the audio source 184 when the audio source 184 has a second orientation relative to the one or more microphones 120. The directivity data updater 150 updates the directivity data 141 to indicate that a difference between the first distance and the first orientation and the second distance and the second orientation corresponds to a difference between the first sound spectrum and the second sound spectrum.

The system 100 enables an audio zoom operation to the zoom target 133 that approximates moving the one or more microphones 120 to the zoom location 136. Generating the one or more output audio signals 138 by adjusting loudness for frequencies based on directivity of the audio source 184 results in a more natural sounding audio zoom as compared to only adjusting gains of the one or more input audio signals 126.

Although the one or more microphones 120, the camera 140, the one or more speakers 160, the display device 162, and the input device 130 are illustrated as being coupled to the device 102, in other implementations the one or more microphones 120, the camera 140, the one or more speakers 160, the display device 162, the input device 130, or a combination thereof may be integrated in the device 102. Various implementations of the system 100 may include fewer, additional, or different components. For example, in some implementations, the directivity data updater 150, the camera 140, or both, can be omitted.

Figure 2B:
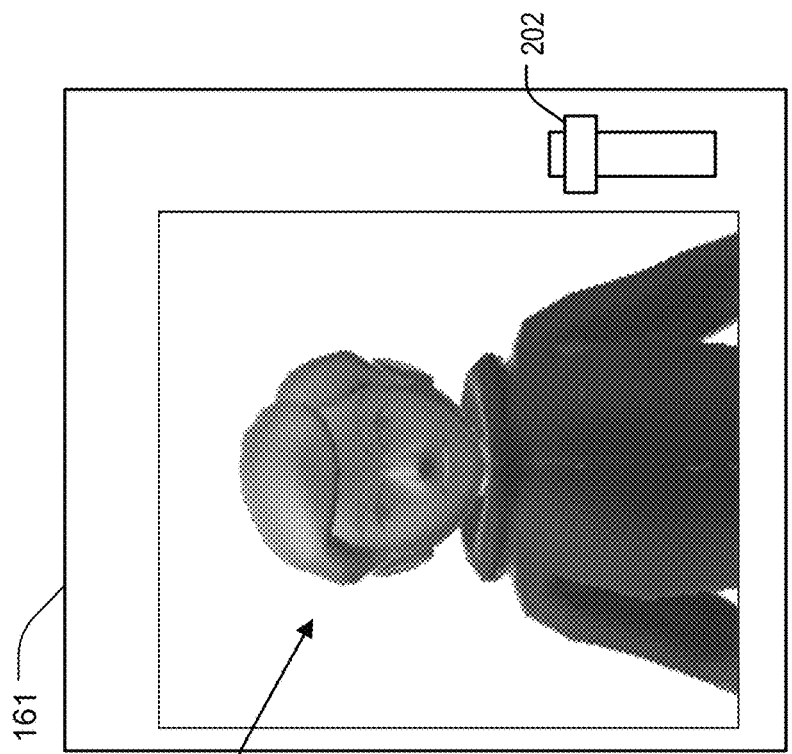
FIG. 2B is a diagram of another illustrative example of a GUI generated by the system of FIG. 1, in accordance with some examples of the present disclosure.
Figure 2A:
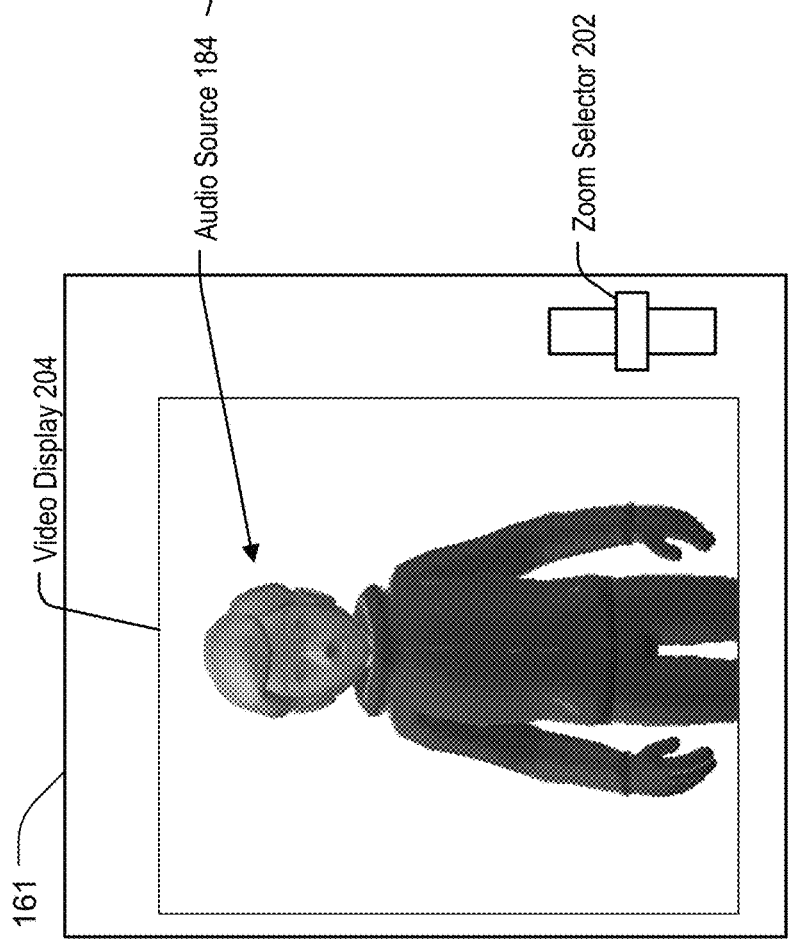
FIG. 2A is a diagram of an illustrative example of a graphical user interface (GUI) generated by the system of FIG. 1, in accordance with some examples of the present disclosure.

Referring to FIG. 2A, an example of the GUI 161 is shown. In a particular aspect, the graphical user interface 161 is generated by the audio enhancer 192, the one or more processors 190, the device 102, the system 100 of FIG. 1, or a combination thereof.

The graphical user interface 161 includes a video display 204 configured to display images corresponding to the image data 145 of FIG. 1. For example, the video display 204 displays images of the audio source 184. The graphical user interface 161 includes a zoom selector 202 that can be used to initiate an audio zoom operation. For example, the user 101 of FIG. 1 can move the zoom selector 202 up to zoom in to the audio source 184 or down to zoom out from the audio source 184. In a particular aspect, moving the zoom selector 202 up corresponds to selecting a first value (e.g., 0 degrees, forward, or zoom in) for the zoom orientation 137, while moving the zoom selector 202 down corresponds to selecting a second value (e.g., 180 degrees, backward, or zoom out) for the zoom orientation 137. An amount of movement of the zoom selector 202 indicates the zoom distance 135. The zoom target 133 includes the zoom distance 135, the zoom orientation 137, or both.

Referring to FIG. 2B, an example of the graphical user interface 161 is shown. In a particular aspect, the graphical user interface 161 is generated by the audio enhancer 192, the one or more processors 190, the device 102, the system 100 of FIG. 1, or a combination thereof.

The graphical user interface 161 indicates that the user 101 has moved the zoom selector 202 to initiate an audio zoom operation. For example, the user 101 uses the input device 130 to move up the zoom selector 202 corresponding to a selection of the zoom orientation 137 (e.g., forward, 0 degrees, or zoom in) and the zoom distance 135 (e.g., 2 feet), and the input device 130 provides the user input 131 indicating the zoom target 133 to the audio enhancer 192. The zoom target 133 indicates the zoom orientation 137 (e.g., 0 degrees, forward, or zoom in) and the zoom distance 135 (e.g., based on an amount of movement of the zoom selector 202). The directivity analyzer 152 generates the equalizer settings 153 based at least in part on the zoom target 133, as further described with reference to FIG. 4. The equalizer 148 generates (e.g., updates) the one or more output audio signals 138 by applying the equalizer settings 153 to the one or more equalizer input audio signals 147, as described with reference to FIG. 1. The equalizer 148 provides the one or more output audio signals 138 to the one or more speakers 160.

In a particular aspect, the one or more processors 190, in response to the user input 131, perform an image zoom operation on the image data 145 and update the video display 204 to display the zoomed version of the image data 145 concurrently with the equalizer 148 providing the one or more output audio signals 138 to the one or more speakers 160. As illustrated, the audio source 184 is enlarged in the video display 204 in FIG. 2B as compared to FIG. 2A, indicating an audio zoom operation has zoomed in to the audio source 184.

The zoom selector 202 is provided as an illustrative example of selecting the zoom target 133. In other implementations, the user 101 may use other ways of specifying the zoom target 133. In a particular example, the graphical user interface 161 is displayed on a touchscreen (e.g., the input device 130) and the user 101 interacts with (e.g., taps or uses a pinch-zoom gesture) the touchscreen to specify the zoom target 133. For example, the user 101 can tap on the touchscreen to select a location on the video display 204 that corresponds to a selection of the zoom location 136, the audio source 184, or both, as the zoom target 133. As another example, the user 101 can use a first pinch-zoom (e.g., widening) gesture to indicate a first value (e.g., forward, 0 degrees, or zoom in) of the zoom orientation 137 or use a second pinch-zoom (e.g., narrowing) gesture to indicate a second value (e.g., backward, 180 degrees, or zoom out) of the zoom orientation 137. A distance of the pinch-zoom gesture indicates the zoom distance 135. The zoom target 133 includes the zoom distance 135, the zoom orientation 137, or both.

In a particular example, the user 101 provides a user input (e.g., a voice command, an option selection, or both) indicating an identifier (e.g., a name) of the zoom location 136, the audio source 184, or both, as the zoom target 133. The audio enhancer 192 performs image recognition on the image data 145, audio analysis of the input audio signals 126, or both, to identify the audio source 184, the zoom location 136, or both. For example, the user 101 provides a user input (e.g., "zoom to Sarah Lee") with an identifier (e.g., contact name) of the audio source 184 (e.g., "Sarah Lee"). The audio enhancer 192 performs image recognition (e.g., person recognition or object recognition) on the image data 145 to identify portions of the image data 145 corresponding to the audio source 184 (e.g., "Sarah Lee"), speech recognition on the input audio signals 126 to identify portions of the input audio signals 126 corresponding to the audio source 184 (e.g., "Sarah Lee"), or both. The zoom target 133 includes the audio source 184.

Figure 3:
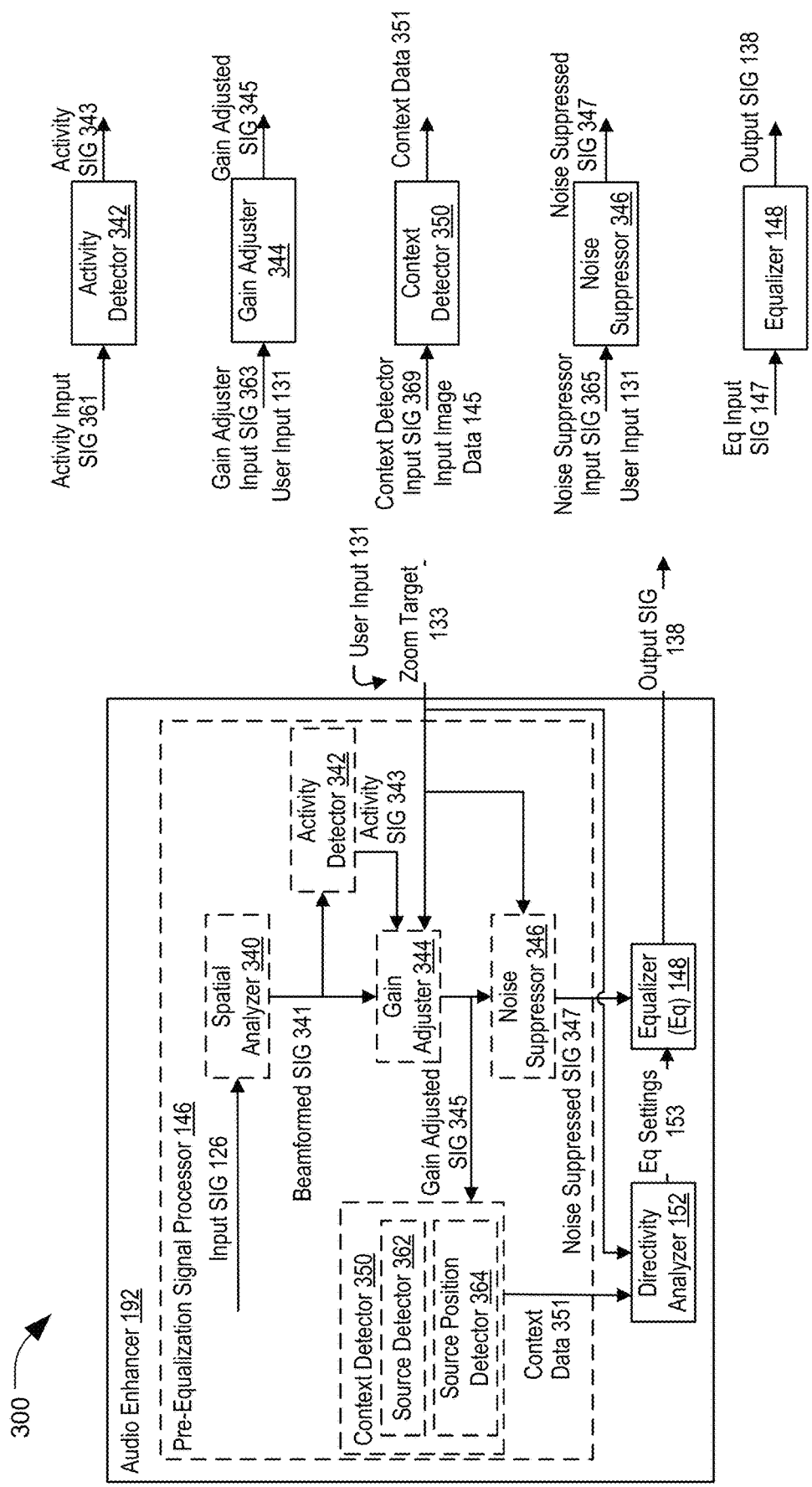
FIG. 3 is a diagram of an illustrative aspect of components of the system of FIG. 1, in accordance with some examples of the present disclosure.

Referring to FIG. 3, a diagram 300 of components of the system 100 of FIG. 1 is shown in accordance with a particular implementation. The pre-equalization signal processor 146 includes a spatial analyzer 340, an activity detector 342, a gain adjuster 344, a noise suppressor 346, a context detector 350, or a combination thereof. The context detector 350 includes a source detector 362, a source position detector 364, or both. One or more of the components shown in dotted lines in FIG. 3 can be omitted in some implementations.

The spatial analyzer 340 is configured to apply beamforming to the one or more input audio signals 126 to generate one or more beamformed audio signals 341. In a particular aspect, the spatial analyzer 340 applies beamforming based on the zoom target 133. For example, the spatial analyzer 340 applies the beamforming based on the zoom orientation 137 of FIG. 1 so that the one or more beamformed audio signals 341 represent sound captured around the zoom orientation 137. The spatial analyzer 340 provides the one or more beamformed audio signals 341 to one or more components of the pre-equalization signal processor 146 or to the equalizer 148. For example, the spatial analyzer 340 provides the one or more beamformed audio signals 341 as one or more activity input audio signals 361 to the activity detector 342, as one or more gain adjuster input audio signals 363 to the gain adjuster 344, as one or more context detector input audio signals 369 to the context detector 350, as one or more noise suppression input audio signals 365 to the noise suppressor 346, as one or more equalizer input audio signals 147 to the equalizer 148, or a combination thereof.

The activity detector 342 is configured to detect activity in the one or more activity input audio signals 361. In a particular implementation, the one or more activity input audio signals 361 include the one or more input audio signals 126. In an alternative implementation, the one or more activity input audio signals 361 include the one or more beamformed audio signals 341.

The activity detector 342 is configured to generate one or more activity audio signals 343 based on activity detected in the one or more activity input audio signals 361. In a particular example, the activity detector 342 (e.g., a speech activity detector) is configured to detect speech in a first activity input audio signal of the one or more activity input audio signals 361 and generate a first activity audio signal of the one or more activity audio signals 343 that includes the speech and a second activity audio signal that includes the remaining sounds of the first activity input audio signal. To illustrate, the first activity audio signal includes reduced or no remaining sounds, and the second activity audio signal includes reduced or no speech.

In a particular implementation, the activity detector 342 is configured to detect sounds corresponding to various types of audio sources, various audio sources of the same type, or both. In an illustrative example, the activity detector 342 is configured to detect first speech associated with a first talker, second speech associated with a second talker, musical sounds associated with a musical instrument, bird sounds associated with a bird, or a combination thereof, in a first activity input audio signal of the one or more activity input audio signals 361. The activity detector 342 is configured to generate a first activity audio signal that includes the first speech (e.g., with none or reduced remaining sounds), a second activity audio signal that includes the second speech (e.g., with none or reduced remaining sounds), a third activity audio signal that includes the musical sounds (e.g., with none or reduced remaining sounds), a fourth activity audio signal that includes the bird sounds (e.g., with none or reduced remaining sounds), a fifth activity audio signal that includes the remaining sounds of the first activity input audio signal, or a combination thereof. The one or more activity audio signals 343 include the first activity audio signal, the second activity audio signal, the third activity audio signal, the fourth activity audio signal, the fifth activity audio signal, or a combination thereof.

The activity detector 342 provides the one or more activity audio signals 343 to one or more components of the pre-equalization signal processor 146, to the equalizer 148, or a combination thereof. For example, the activity detector 342 provides the one or more activity audio signals 343 as the one or more gain adjuster input audio signals 363 to the gain adjuster 344, the one or more context detector input audio signals 369 to the context detector 350, the one or more noise suppression input audio signals 365 to the noise suppressor 346, the one or more equalizer input audio signals 147 to the equalizer 148, or a combination thereof.

The gain adjuster 344 applies one or more gains to the one or more gain adjuster input audio signals 363. The one or more gain adjuster input audio signals 363 include the one or more input audio signals 126, the one or more beamformed audio signals 341, or the one or more activity audio signals 343. The gain adjuster 344 applies the one or more gains based on the zoom target 133. For example, when the audio zoom operation corresponds to zooming in to the zoom target 133, the gain adjuster 344 increases the gains of first input audio signals of the one or more gain adjuster input audio signals 363 corresponding to sounds from the zoom orientation 137, reduces gains of second input audio signals of the one or more gain adjuster input audio signals 363 corresponding to sounds from remaining directions, or both. In another example, when the audio zoom operation corresponds to zooming away from the zoom target 133, the gain adjuster 344 decreases the gains of first input audio signals of the one or more gain adjuster input audio signals 363 corresponding to sounds from the zoom orientation 137, increases gains of second input audio signals of the one or more gain adjuster input audio signals 363 corresponding to sounds from remaining directions, or both. In a particular aspect, the amount of gain adjustment is based on the zoom distance 135.

The gain adjuster 344 provides the one or more gain adjusted audio signals 345 to one or more components of the pre-equalization signal processor 146, to the equalizer 148, or a combination thereof. For example, the gain adjuster 344 provides the one or more gain adjusted audio signals 345 as the one or more context detector input audio signals 369 to the context detector 350, the one or more noise suppression input audio signals 365 to the noise suppressor 346, the one or more equalizer input audio signals 147 to the equalizer 148, or a combination thereof.

The context detector 350 processes the one or more context detector input audio signals 369, the image data 145, or a combination thereof, to generate context data 351. In a particular aspect, the one or more context detector input audio signals 369 includes the one or more input audio signals 126, the one or more beamformed audio signals 341, the one or more activity audio signals 343, or the one or more gain adjusted audio signals 345.

The source detector 362 performs audio source recognition on the one or more context detector input audio signals 369, the image data 145, or a combination thereof, to identify an audio source type of one or more audio sources, such as the audio source 184. For example, the source detector 362 performs image analysis (e.g., object recognition and distance analysis) on the image data 145 to determine that the image data 145 indicates an audio source type (e.g., a human talker) at a first location relative to the camera 140. In a particular aspect, the source detector 362 performs sound analysis (e.g., audio source recognition and distance analysis) on the one or more context detector input audio signals 369 to determine that the one or more context detector input audio signals 369 include sounds matching the audio source type from a second location relative to the one or more microphones 120. In a particular aspect, the source detector 362 determines that the first location relative to the camera 140 corresponds to the same physical location as the second location relative to the one or more microphones 120. The source detector 362 provides source detection data indicating the audio source type, the first location relative to the camera 140, the second location relative to the one or more microphones 120, the physical location, or a combination thereof, to the source position detector 364.

The source position detector 364 performs image analysis to detect the orientation of the audio source 184 in the image data 145 relative to the camera 140. To illustrate, if the audio source 184 corresponds to a human talker, the source position detector 364 estimates an orientation of the head of the human talker (e.g., looking towards the camera 140 or looking away from the camera 140) by performing image recognition on the image data 145.

In an illustrative example, the source position detector 364 determines the orientation of the audio source 184 relative to the one or more microphones 120 based on the orientation of the audio source 184 relative to the camera 140 and a difference in locations of the camera 140 and the one or more microphones 120. The context detector 350 determines that the second location relative to the one or more microphones 120 indicates the distance of the audio source 184 from the one or more microphones 120. The context detector 350 generates context data 351 indicating the distance of the audio source 184 from the one or more microphones 120, the orientation of the audio source 184 relative to the one or more microphones 120, the audio source type of the audio source 184, or a combination thereof. The context detector 350 provides the context data 351 to the directivity analyzer 152.

The noise suppressor 346 performs noise suppression on the one or more noise suppression input audio signals 365 to generate one or more noise suppressed audio signals 347. In a particular aspect, the one or more noise suppression input audio signals 365 include the one or more input audio signals 126, the one or more beamformed audio signals 341, the one or more activity audio signals 343, or the one or more gain adjusted audio signals 345. The noise suppressor 346 provides the one or more noise suppressed audio signals 347 as the one or more equalizer input audio signals 147 to the equalizer 148.

The particular order of operations of the components of the pre-equalization signal processor 146 is provided as an illustrative example. In other examples, the order of operations of the components of the pre-equalization signal processor 146 can be different. In a particular example, the zoom target 133 indicates a selection of the audio source 184. The context detector 350, based on the zoom target 133, provides the audio source type (e.g., a human talker or a bird) of the audio source 184 to the activity detector 342. The activity detector 342 generates first activity signals of the one or more activity audio signals 343 that correspond to sounds of the audio source type (e.g., with reduced or no remaining sounds), second activity signals that correspond to remaining sounds (e.g., with no or reduced sounds of the audio source type), or a combination. The activity detector 342 provides the one or more activity audio signals 343 to the gain adjuster 344. The gain adjuster 344, in response to determining that the audio zoom operation includes zooming towards the zoom target 133, increases gain of the first activity signals, reduces gain of the second activity signals, or both. Alternatively, the gain adjuster 344, in response to determining that the audio zoom operation includes zooming away from the zoom target 133, decreases gain of the first activity signals, increases gain of the second activity signals, or both.

In a particular aspect, the directivity analyzer 152 obtains the directivity data 141 based on the audio source type of the audio source 184, as further described with reference to FIG. 4. The directivity analyzer 152 generates the equalizer settings 153 based on the directivity data 141, as further described with reference to FIG. 4. The directivity analyzer 152 provides the equalizer settings 153 to the equalizer 148.

The equalizer 148 applies the equalizer settings 153 to the one or more equalizer input audio signals 147 to generate the one or more output audio signals 138. In a particular aspect, the one or more equalizer input audio signals 147 include the one or more input audio signals 126, the one or more activity audio signals 343, the one or more gain adjusted audio signals 345, or the one or more noise suppressed audio signals 347.

The pre-equalization signal processor 146 thus performs pre-equalization signal processing to improve performance of the audio enhancer 192 by beamforming, adjusting gains, reducing noise, or a combination thereof, prior to performing the equalization. In a particular aspect, the pre-equalization signal processor 146 determines the context data 351 to enable the directivity analyzer 152 to determine the equalizer settings 153 based on directivity of audio source types of one or more audio sources.

In some implementations, the pre-equalization signal processor 146 can be omitted. As an example, the directivity analyzer 152 generates the equalizer settings 153 based on default directivity data and the equalizer 148 applies the equalizer settings 153 to (e.g., adjusts mid-frequencies of) the one or more input audio signals 126 to generate the one or more output audio signals 138.

In some implementations, one or more components of the pre-equalization signal processor 146 can be omitted. In an example, the spatial analyzer 340 and the activity detector 342 are omitted and the one or more input audio signals 126 are provided as the one or more gain adjuster input audio signals 363 to the gain adjuster 344. In some implementations, the spatial analyzer 340 is omitted and the one or more input audio signals 126 are provided as the one or more activity input audio signals 361 to the activity detector 342. In some implementations, the activity detector 342 is omitted and the one or more beamformed audio signals 341 are provided as the one or more gain adjuster input audio signals 363 to the gain adjuster 344. In some implementations, the gain adjuster 344 is omitted and the one or more activity audio signals 343 are provided as the one or more context detector input audio signals 369 to the context detector 350 and as the one or more noise suppression input audio signals 365 to the noise suppressor 346. The specific combinations of components are described as illustrative examples. In other implementations, other combinations of the components are included in the pre-equalization signal processor 146.

Figure 4:
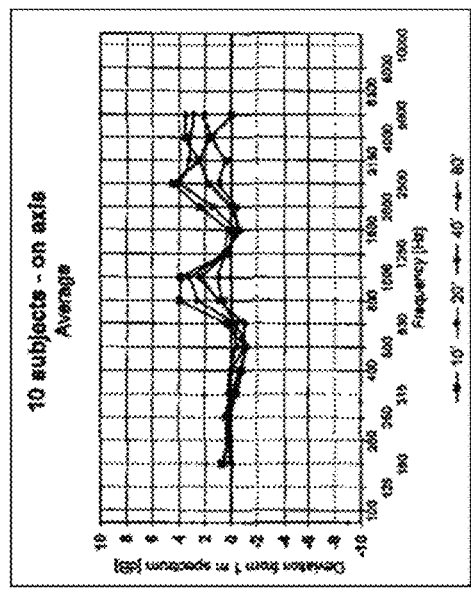
FIG. 4 is a diagram of an illustrative aspect of components of the system of FIG. 1, in accordance with some examples of the present disclosure.
Figure 4:
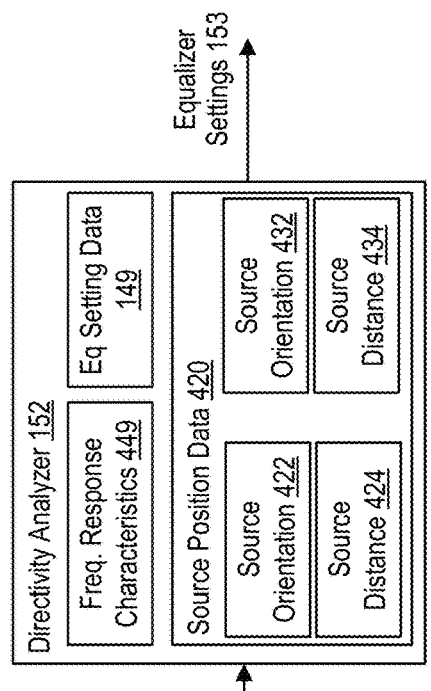
Figure 4:
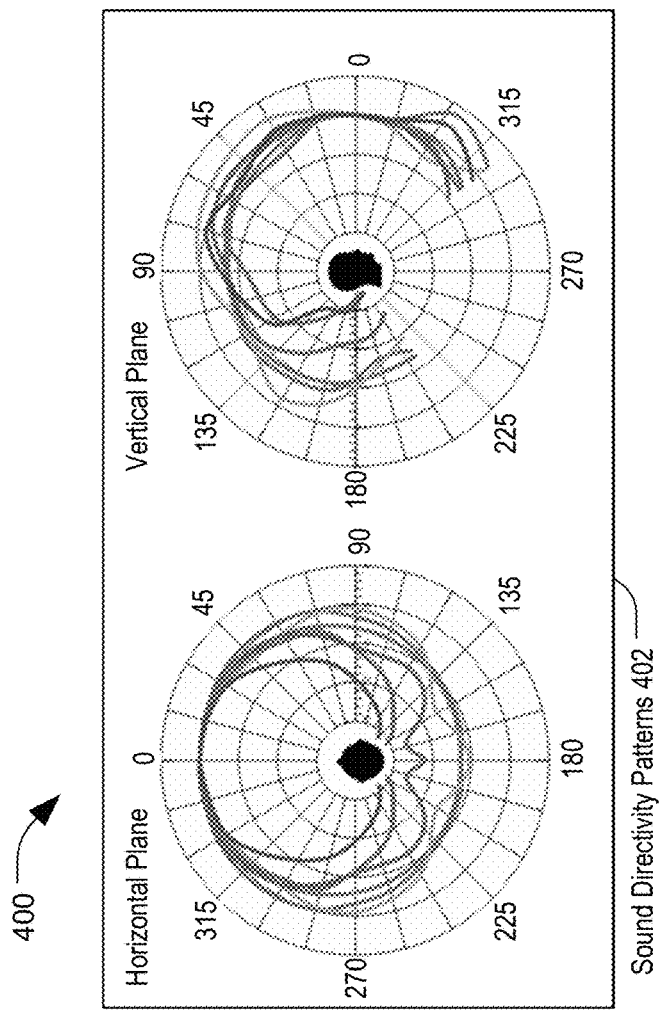
Figure 4:
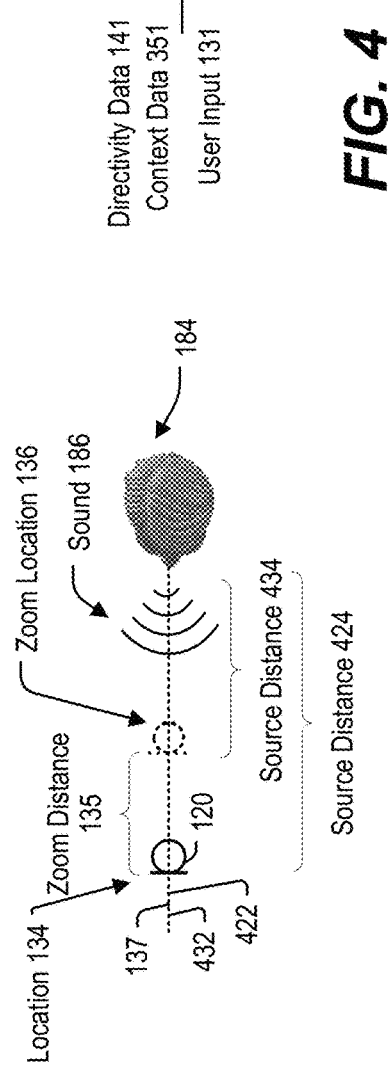

Referring to FIG. 4, a diagram 400 of a particular example of components of the system 100 of FIG. 1 is shown. The directivity analyzer 152 is illustrated as obtaining the directivity data 141, the context data 351, and the user input 131. The context data 351 includes source position data 420 of the audio source 184. For example, the source position data 420 indicates a source orientation 422 of the audio source 184 relative to (e.g., 0 degrees or facing towards) the one or more microphones 120, a source distance 424 (e.g., 6 feet) of the audio source 184 from the one or more microphones 120, or both, as described with reference to FIG. 3.

The source position detector 364 of FIG. 3 determines, based on the source orientation 422 (e.g., 0 degrees) and the zoom orientation 137 (e.g., 0 degrees), a source orientation 432 (e.g., 0 degrees) of the audio source 184 relative to the zoom location 136. The source position detector 364 determines a source distance 434 (e.g., 4 feet) of the audio source 184 from the zoom location 136 based on the zoom distance 135 (e.g., 2 feet), the zoom orientation 137 (e.g., 0 degrees), and the source distance 424 (e.g., 6 feet).

In a particular aspect, the directivity analyzer 152 obtains the directivity data 141 based on an audio source type of the audio source 184. As an example, a graphical depiction of sound directivity patterns 402 indicate frequency-dependent directivity of the audio source type (e.g., a human talker) in the horizontal plane and the vertical plane. In a particular aspect, the directivity data 141 includes a plurality of directivity data sets associated with various orientations of the audio source type. The directivity analyzer 152 selects a directivity data set 404 from the directivity data 141 in response to determining that the directivity data set 404 is associated with a particular orientation (e.g., on axis, 0 degrees along the horizontal axis and the vertical axis), of the audio source type, that matches the source orientation 422 and the source orientation 432.

A graphical depiction of the directivity data set 404 indicates frequency response characteristics of the audio source type (e.g., the audio source 184) corresponding to changes in distance (e.g., of a microphone) from a particular distance (e.g., 1 meter) to various distances along the particular orientation. For example, the directivity data set 404 indicates frequency response characteristics 449 of the audio source type (e.g., the audio source 184) for a change from the source distance 424 (e.g., 1 meter) to the source distance 434 (e.g., 1 centimeter) along the particular orientation (e.g., on axis). In a particular aspect, the frequency response characteristics 449 indicate changes in loudness (e.g., decibels (dB)) for various sound frequencies. For example, the frequency response characteristics 449 indicate that moving from the source distance 424 (e.g., 1 meter) towards the source distance 434 (e.g., 1 centimeter) along the particular orientation (e.g., on axis) corresponds to a drop in loudness (e.g., −0.2 dB) for a particular frequency (e.g., 500 hertz (Hz)), a rise in loudness (e.g., +4 dB) for another frequency range (e.g., 800 Hz to 1 kilohertz (kHz)), or both. In a particular example, the frequency response characteristics 449 indicate that moving from the source distance 424 (e.g., 1 meter) towards the source distance 434 (e.g., 1 centimeter) along the particular orientation (e.g., on axis) corresponds to negligible (e.g., below a threshold) changes in loudness for another particular frequency range (e.g., 200 Hz to 400 Hz). To illustrate, the changes in loudness for the particular frequency range (e.g., 200 Hz to 400 Hz) may be imperceptible to a human auditory system.

In a particular example, the source orientation 422 matches the source orientation 432 and the directivity analyzer 152 selects the directivity data set 404 corresponding to the change in source distance along the particular orientation (e.g., the source orientation 422 and the source orientation 432). In this example, the directivity data set 404 indicates the frequency response characteristics 449 corresponding to the change in source distance (e.g., from the source distance 424 to the source distance 434) along the particular orientation (e.g., the source orientation 422 and the source orientation 432). In some other examples, the source orientation 422 differs from the source orientation 432, as further described with reference to FIG. 6, and the directivity analyzer 152 selects a directivity data set from the directivity data 141 that indicates the frequency response characteristics 449 corresponding to the change in source distance (e.g., from the source distance 424 to the source distance 434) and the change in source orientation (e.g., from the source orientation 422 to the source orientation 432).

In a particular aspect, the directivity analyzer 152 obtains the equalizer setting data 149 from the memory 132, another device, a network, or a combination thereof. In a particular implementation, the equalizer setting data 149 associates the context data 351 (e.g., the audio source type of the audio source 184), the directivity data 141 (e.g., the directivity data set 404), the zoom distance 135, the source distance 424, the source distance 434, the zoom orientation 137, the source orientation 422, the source orientation 432, frequency response characteristics (e.g., the frequency response characteristics 449), or a combination thereof, with the equalizer settings 153. The directivity analyzer 152 selects, based on the equalizer setting data 149, the equalizer settings 153 that match the audio source type of the audio source 184, the zoom distance 135, the source distance 424, the source distance 434, the zoom orientation 137, the source orientation 422, the source orientation 432, the frequency response characteristics 449, or a combination thereof.

In a particular aspect, the directivity analyzer 152 selects, based on the equalizer setting data 149, the equalizer settings 153 that match the frequency response characteristics 449. For example, the equalizer settings 153 correspond to a drop in loudness (e.g., −0.2 dB) for a particular frequency (e.g., 500 Hz), a rise in loudness (e.g., +4 dB) for a first frequency range (e.g., 800 Hz to 1 kilohertz (kHz)), no changes in loudness for a second frequency range (e.g., 200 Hz to 400 Hz), or a combination thereof. The directivity analyzer 152 thus generates the equalizer settings 153 so that applying the equalizer settings 153 approximates the frequency response characteristics of moving the one or more microphones 120 to (or closer to) the zoom location 136.

Figure 5:
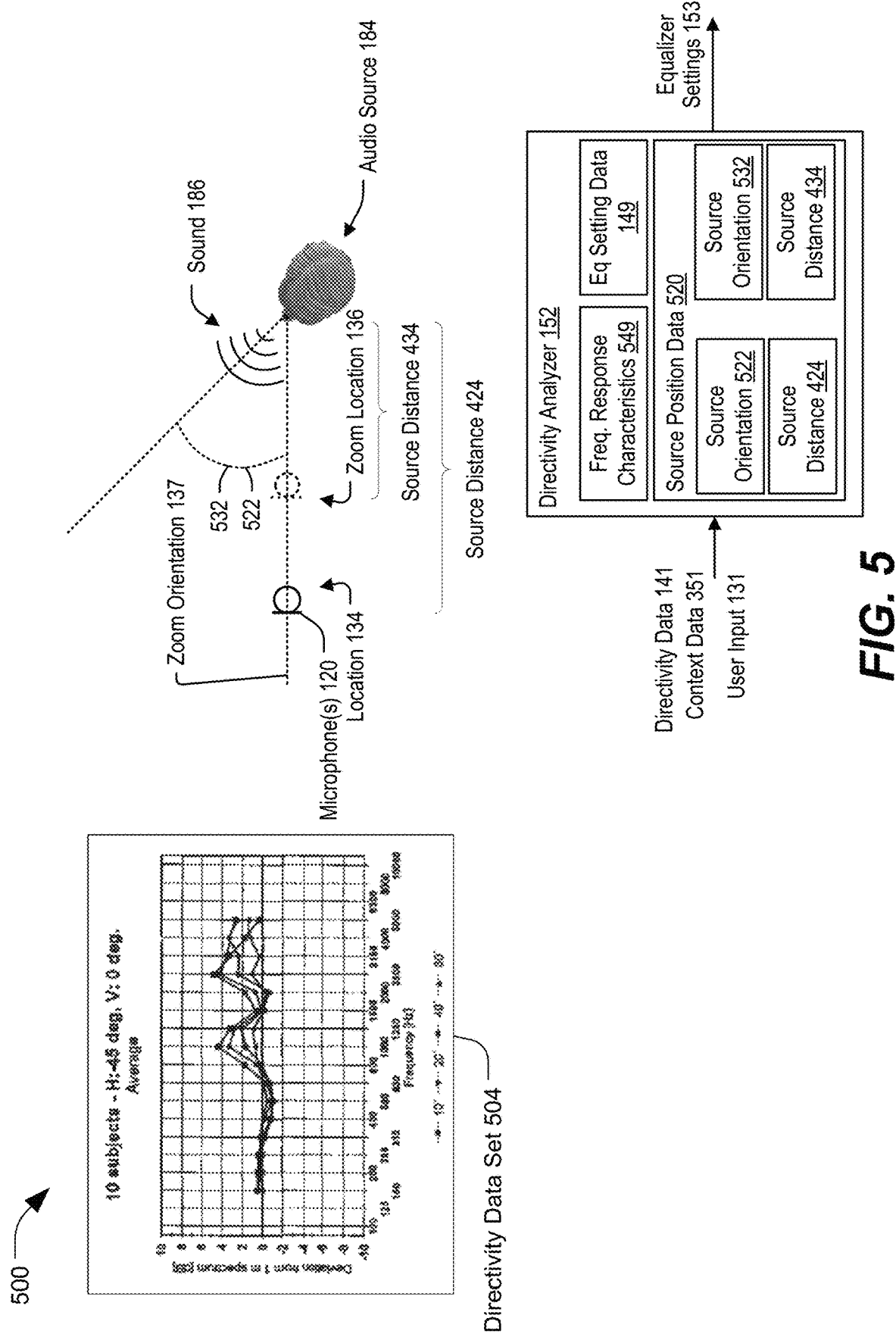
FIG. 5 is a diagram of an illustrative aspect of components of the system of FIG. 1, in accordance with some examples of the present disclosure.

Referring to FIG. 5, a diagram 500 of a particular example of components of the system 100 of FIG. 1 in shown. A graphical depiction of a directivity data set 504 of the directivity data 141 indicates frequency response characteristics of the audio source type (e.g., a human talker) of the audio source 184 for a particular orientation (e.g., −45 degrees horizontal axis and 0 degrees vertical axis). For example, the directivity data set 504 indicates frequency response characteristics corresponding to changes in distance (e.g., of a microphone) from a particular distance (e.g., 1 meter) to various distances along the particular orientation.

The context detector 350 of FIG. 3 determines source position data 520 of the audio source 184, as described with reference to FIG. 3. For example, the source position data 520 indicates that the audio source 184 is located approximately at the source distance 424 (e.g., 1 meter) with a source orientation 522 (e.g., −45 degrees horizontal axis and 0 degrees vertical axis) relative to the location 134 of the one or more microphones 120. The source position data 520 indicates that the audio source 184 is located approximately at the source distance 434 (e.g., 10 centimeters) with source orientation 532 (e.g., −45 degrees horizontal axis and 0 degrees vertical axis) relative to the zoom location 136.

The directivity analyzer 152 selects the directivity data set 504 from the directivity data 141 in response to determining that the source orientation 422 (e.g., −45 degrees on the horizontal axis and 0 degrees on the vertical axis) and the source orientation 432 (e.g., −45 degrees on the horizontal axis and 0 degrees on the vertical axis) match the particular orientation (e.g., −45 degrees horizontal axis and 0 degrees vertical axis) associated with the directivity data set 504. The directivity data set 504 indicates frequency response characteristics 549 for a change from the source distance 424 (e.g., 1 meter) to the source distance 434 (e.g., 1 centimeter) along the particular orientation (e.g., −45 degrees on the horizontal axis and 0 degrees on the vertical axis). In a particular aspect, the frequency response characteristics 549 indicate that moving from the source distance 424 (e.g., 1 meter) towards the source distance 434 (e.g., 1 centimeter) along the particular orientation (e.g., −45 degrees on the horizontal axis and 0 degrees on the vertical axis) corresponds to a drop in loudness (e.g., −0.2 dB) for a first frequency (e.g., 500 Hz), a first rise in loudness (e.g., +2 dB) for a second frequency (e.g., 800 Hz), a second rise in loudness (e.g., +4 dB) for a third frequency (e.g., 1 kHz), negligible (e.g., below a threshold) changes in loudness for a particular frequency range (e.g., 200 Hz to 315 Hz), or a combination thereof.

In a particular aspect, the directivity analyzer 152 selects, based on the equalizer setting data 149, the equalizer settings 153 that match the frequency response characteristics 549. For example, the equalizer settings 153 correspond to a drop in loudness (e.g., −0.2 dB) for the first frequency (e.g., 500 Hz), a first rise in loudness (e.g., +2 dB) for a second frequency (e.g., 800 Hz), a second rise in loudness (e.g., +4 dB) for a third frequency, no changes in loudness for the particular frequency range (e.g., 200 Hz to 315 Hz), or a combination thereof. The directivity analyzer 152 thus generates the equalizer settings 153, based on the directivity data set 504, so that applying the equalizer settings 153 approximates the frequency response characteristics of moving the one or more microphones 120 to (or closer to) the zoom location 136 when the audio source 184 has the particular orientation (e.g., −45 degrees on the horizontal axis and 0 degrees on the vertical axis) relative to the one or more microphones 120.

Figure 6:
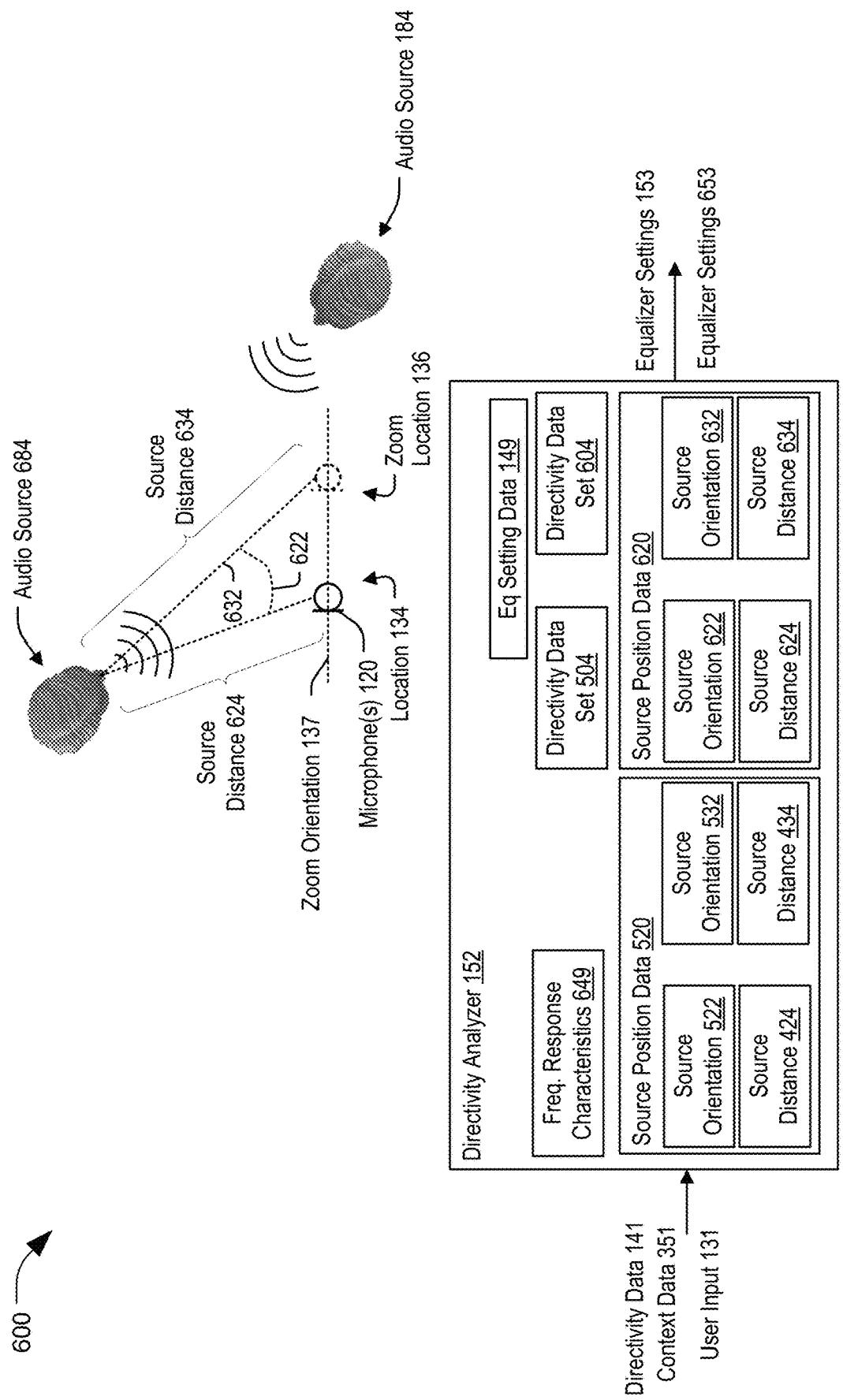
FIG. 6 is a diagram of an illustrative aspect of components of the system of FIG. 1, in accordance with some examples of the present disclosure.

Referring to FIG. 6, a diagram 600 of an example of components of the system 100 of FIG. 1 is shown according to an implementation in which the context detector 350 of FIG. 3 has detected multiple audio sources, e.g., the audio source 184 and an audio source 684, based on the one or more context detector input audio signals 369 of FIG. 3.

The context detector 350 determines source position data 620 of the audio source 684, in a similar manner as described with reference to FIG. 3. For example, the source position data 620 indicates that audio source 684 is located approximately at a source distance 624 (e.g., 2 meters) with a source orientation 622 (e.g., −30 degrees horizontal axis and 0 degrees vertical axis) relative to the location 134 of the one or more microphones 120. In a particular aspect, the source position data 620 indicates that the audio source 684 is located approximately at a source distance 634 (e.g., 2.2 meters) with a source orientation 632 (e.g., −2 degrees horizontal axis and 0 degrees vertical axis) relative to the zoom location 136.

In a particular implementation, the zoom target 133 indicates the audio source 184 and the directivity analyzer 152 disregards the audio source 684 in determining the equalizer settings 153. In a particular aspect, the one or more output audio signals 138 includes reduced (e.g., no) sounds of the audio source 684. As an example, the activity detector 342 generates the one or more activity audio signals 343 corresponding to sounds of the audio source 184 with reduced (e.g., none) sounds of the audio source 684. As another example, the gain adjuster 344 generates the one or more gain adjusted audio signals 345 with reduced (e.g., no) sounds of the audio source 684. In another example, the spatial analyzer 340 applies beamforming to generate the one or more beamformed audio signals 341 with reduced (e.g., no) sounds of the audio source 684. In this implementation, the directivity analyzer 152 generates the equalizer settings 153 based on the directivity data set 504 and the source position data 520, as described with reference to FIG. 5.

In a particular implementation, the zoom target 133 indicates the audio source 184 and the audio enhancer 192 generates the one or more output audio signals 138 with sounds of the audio source 184 adjusted based on directivity of the audio source 184 with little or no changes to sounds of the audio source 684. As an example, the activity detector 342 generates a first subset of the one or more activity audio signals 343 corresponding to sounds of the audio source 184 with reduced (e.g., no) sounds of the audio source 684 and a second subset of the one or more activity audio signals 343 corresponding to remaining sounds (e.g., including sounds of the audio source 684) with reduced (e.g., no) sounds of the audio source 184.

The directivity analyzer 152 generates the equalizer settings 153 based on the directivity data set 504 and the source position data 520, as described with reference to FIG. 5. The one or more equalizer input audio signals 147 include the first subset of the one or more activity audio signals 343, a gain-adjusted version of the first subset of the one or more activity audio signals 343, a noise-suppressed version of the first subset of the one or more activity audio signals 343, or a combination thereof. The equalizer 148 generates a first subset of the one or more output audio signals 138 by applying the equalizer settings 153 to the one or more equalizer input audio signals 147, generating a psychoacoustic enhanced version of sounds from the audio source 184 that are perceived as if the user 101 were located at the zoom location 136.

A second subset of the one or more output audio signals 138 is based on the second subset of the one or more activity audio signals 343 and includes sounds from the audio source 684. For example, the second subset of the one or more output audio signals 138 includes the second subset of the one or more activity audio signals 343, a gain-adjusted version of the second subset of the one or more activity audio signals 343, a noise-suppressed version of the second subset of the one or more activity audio signals 343, or a combination thereof.

The one or more output audio signals 138 thus approximate frequency response characteristics of the audio source 184 with moving the one or more microphones 120 from the location 134 to the zoom location 136 and no (or little) changes for the audio source 684. In this implementation, the audio zoom operation appears to zoom relative to the audio source 184 with little or no change relative to the audio source 684. For example, sounds of the audio source 184 in the one or more output audio signals 138 appear to be coming from the audio source 184 at approximately the source distance 434 with the source orientation 532 relative to the zoom location 136. Sounds of the audio source 684 in the one or more output audio signals 138 appear to be coming from the audio source 684 at approximately the source distance 624 with the source orientation 622 relative to the zoom location 136.

In another particular implementation, the zoom target 133 indicates the audio source 184 and the audio enhancer 192 generates the one or more output audio signals 138 in an operation that includes adjusting sounds of the audio source 184 based on directivity of the audio source 184 and adjusting sounds of the audio source 684 adjusted based on directivity of the audio source 684. In a particular aspect, the audio source 684 has the same audio source type (e.g., a human talker) as the audio source 184. In this aspect, the directivity analyzer 152 selects a directivity data set 604 from the directivity data 141 that matches the change in orientation (e.g., from the source orientation 622 to the source orientation 632) and the change in distance (e.g., from the source distance 624 to the source distance 634) associated with the audio source 684.

In an alternative aspect, the audio source 684 has a second audio source type (e.g., a bird) that is different from a first audio source type (e.g., a human talker) of the audio source 184. In this aspect, the directivity analyzer 152 obtains second directivity data associated with the second audio source type and selects the directivity data set 604 from the second directivity data that indicates frequency response characteristics of the audio source 684 for the change in orientation (e.g., from the source orientation 622 to the source orientation 632) and from the source distance 624 to various distances. To illustrate, the directivity data set 604 indicates frequency response characteristics 649 for the change in orientation (e.g., from the source orientation 622 to the source orientation 632) and the change in distance (e.g., from the source distance 624 to the source distance 634).

The directivity analyzer 152 determines, based on the equalizer setting data 149, equalizer settings 653 that match the frequency response characteristics 649. The directivity analyzer 152 provides the equalizer settings 653 corresponding to the audio source 684 and the equalizer settings 153 corresponding to the audio source 184 to the equalizer 148.

In a particular aspect, the activity detector 342 generates a first subset of the one or more activity audio signals 343 corresponding to sounds of the audio source 184 and reduced (e.g., no) other sounds, a second subset of the one or more activity audio signals 343 corresponding to sounds of the audio source 684 and reduced (e.g., no) other sounds, a third subset of the one or more activity audio signals 343 corresponding to remaining sounds and reduced (e.g., no) sounds of the audio source 184 and the audio source 684, or a combination thereof. In a particular aspect, a first subset of the one or more equalizer input audio signals 147 is based on the first subset of the one or more activity audio signals 343, a second subset of the one or more equalizer input audio signals 147 is based on the second subset of the one or more activity audio signals 343, a third subset of the one or more equalizer input audio signals 147 is based on the third subset of the one or more activity audio signals 343, or a combination thereof. The equalizer 148 generates the one or more output audio signals 138 by applying the equalizer settings 153 on the first subset of the one or more equalizer input audio signals 147 corresponding to the audio source 184, the equalizer settings 653 on the second subset of the one or more equalizer input audio signals 147 corresponding to the audio source 684, no changes to the third subset of the one or more equalizer input audio signals 147 corresponding to remaining audio, or a combination thereof. The equalizer settings 153 and the equalizer settings 653 thus enable the one or more output audio signals 138 to approximate the frequency response characteristics of the audio source 184 and the audio source 684 associated with moving the one or more microphones 120 from the location 134 to the zoom location 136. For example, sounds of the audio source 184 in the one or more output audio signals 138 appear to be coming from the audio source 184 at approximately the source distance 434 with the source orientation 532 relative to the zoom location 136. Sounds of the audio source 684 in the one or more output audio signals 138 appear to be coming from the audio source 684 at approximately the source distance 634 with the source orientation 632 relative to the zoom location 136.

Figure 7:
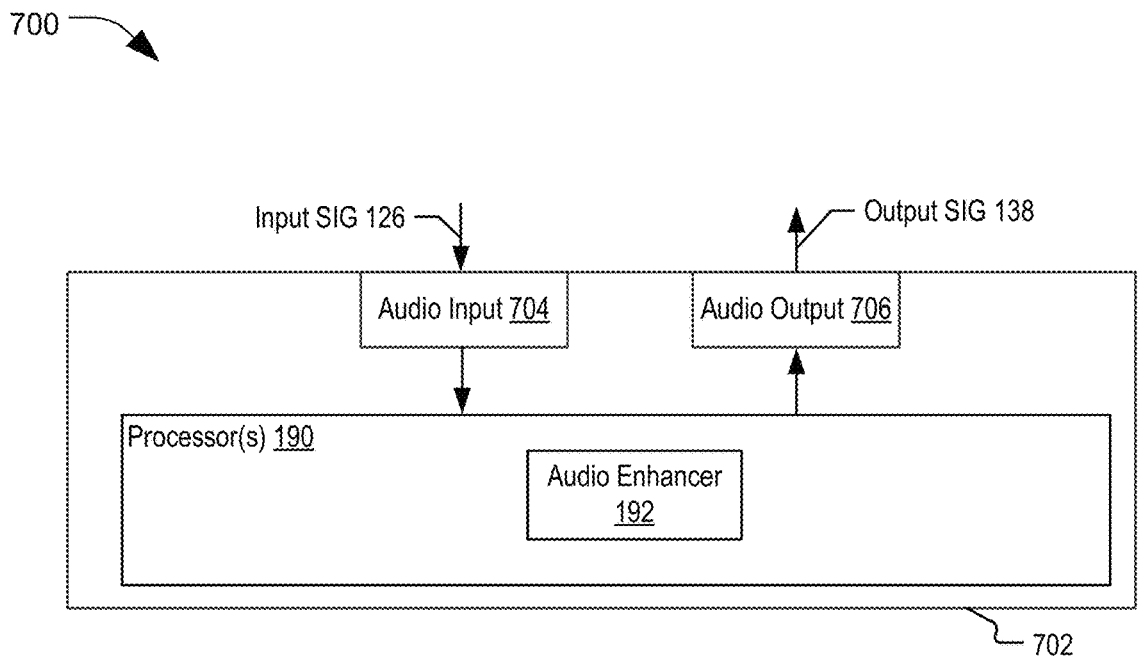
FIG. 7 illustrates an example of an integrated circuit operable to perform psychoacoustic enhancement based on audio source directivity, in accordance with some examples of the present disclosure.
Figure 11:
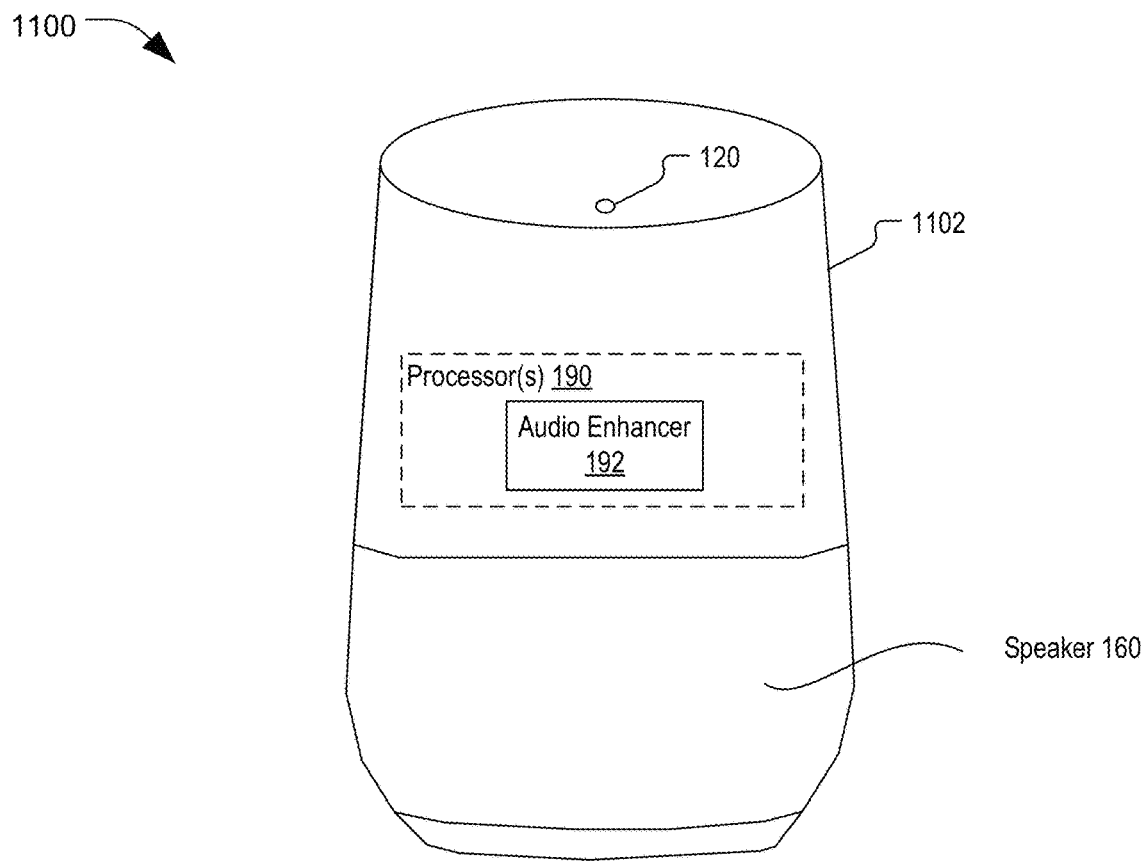
FIG. 11 is a diagram of a voice-controlled speaker system operable to perform psychoacoustic enhancement based on audio source directivity, in accordance with some examples of the present disclosure.
Figure 12:
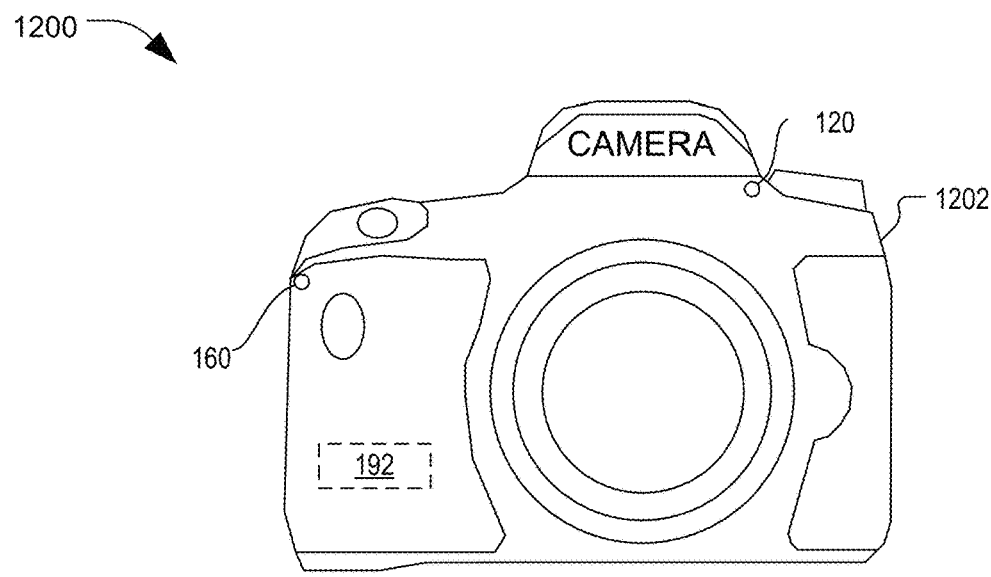
FIG. 12 is a diagram of a camera operable to perform psychoacoustic enhancement based on audio source directivity, in accordance with some examples of the present disclosure.
Figure 13:
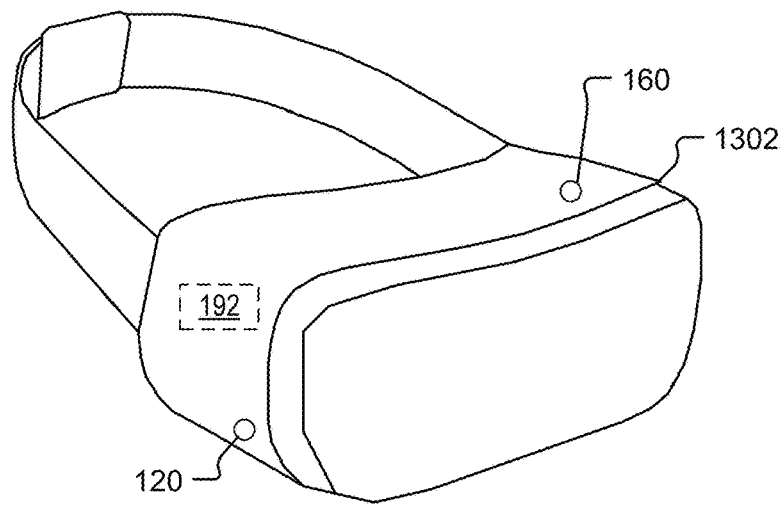
FIG. 13 is a diagram of a headset, such as a virtual reality or augmented reality headset, operable to perform psychoacoustic enhancement based on audio source directivity, in accordance with some examples of the present disclosure.
Figure 14:
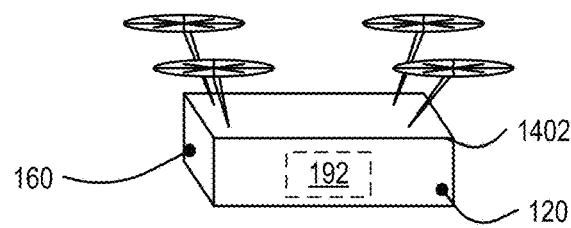
FIG. 14 is a diagram of a first example of a vehicle operable to perform psychoacoustic enhancement based on audio source directivity, in accordance with some examples of the present disclosure.
Figure 15:
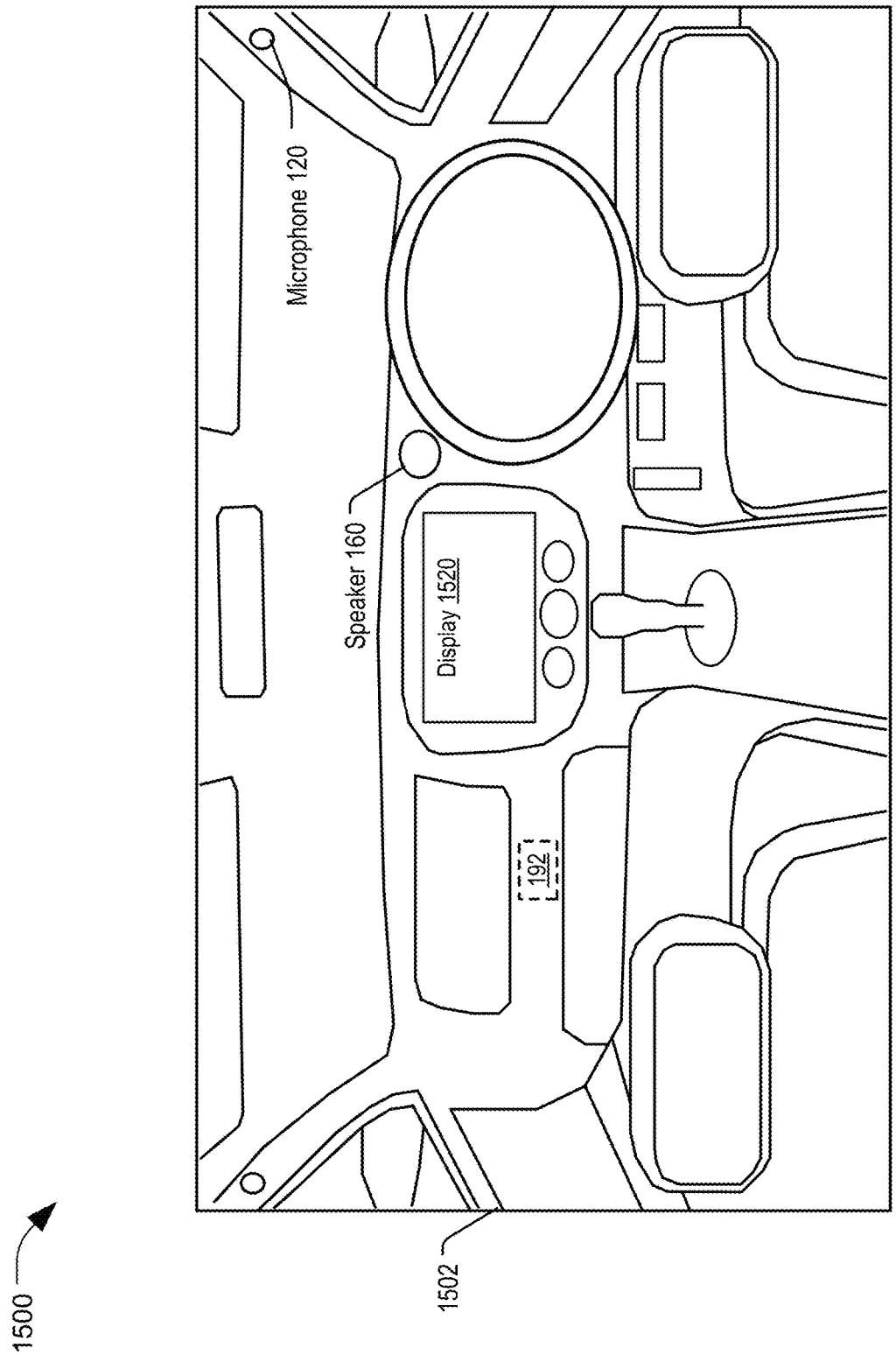
FIG. 15 is a diagram of a second example of a vehicle operable to perform psychoacoustic enhancement based on audio source directivity, in accordance with some examples of the present disclosure.

FIG. 7 depicts an implementation 700 of the device 102 as an integrated circuit 702 that includes the one or more processors 190. The integrated circuit 702 also includes an audio input 704, such as one or more bus interfaces, to enable the one or more input audio signals 126 to be received for processing. The integrated circuit 702 also includes an audio output 706, such as a bus interface, to enable sending of an output signal, such as the one or more output audio signals 138. The integrated circuit 702 enables implementation of psychoacoustic enhancement based on audio source directivity as a component in a system, such as a mobile phone or tablet as depicted in FIG. 8, a headset as depicted in FIG. 9, a wearable electronic device as depicted in FIG. 10, a voice-controlled speaker system as depicted in FIG. 11, a camera as depicted in FIG. 12, a virtual reality headset or an augmented reality headset as depicted in FIG. 13, or a vehicle as depicted in FIG. 14 or FIG. 15.

Figure 8:
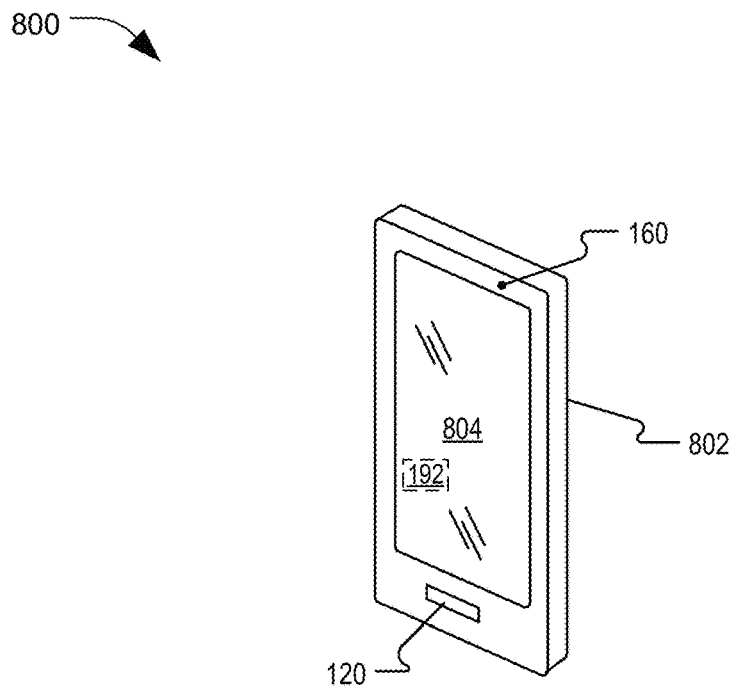
FIG. 8 is a diagram of a mobile device operable to perform psychoacoustic enhancement based on audio source directivity, in accordance with some examples of the present disclosure.

FIG. 8 depicts an implementation 800 in which the device 102 includes a mobile device 802, such as a phone or tablet, as illustrative, non-limiting examples. The mobile device 802 includes the one or more speakers 160, the one or more microphones 120, and a display screen 804. Components of the processor 190, including the audio enhancer 192, are integrated in the mobile device 802 and are illustrated using dashed lines to indicate internal components that are not generally visible to a user of the mobile device 802. In a particular example, the audio enhancer 192 operates to enhance user voice activity, which is then processed to perform one or more operations at the mobile device 802, such as to launch a graphical user interface or otherwise display other information associated with the user's speech at the display screen 804 (e.g., via an integrated "smart assistant" application). In a particular example, the audio enhancer 192 enhances voice activity of a talker during an online meeting. To illustrate, a user can see the talker on the display screen 804 during the online meeting and selects the talker as a zoom target. The audio enhancer 192 enhances speech of the talker in response to the selection of the zoom target. In another example, a user of a bird tracking application of the mobile device 802 selects a tree as a zoom target. The audio enhancer 192 enhances bird sounds from a bird on the tree in response to the selection of the zoom target.

Figure 9:
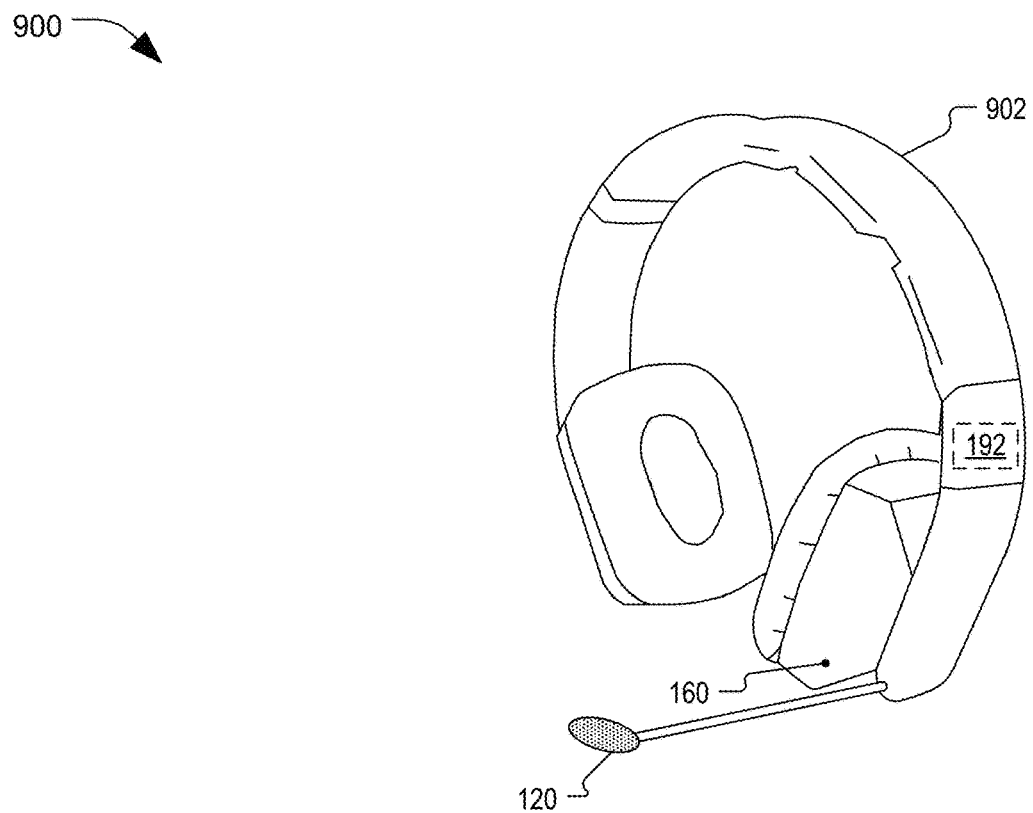
FIG. 9 is a diagram of a headset operable to perform psychoacoustic enhancement based on audio source directivity, in accordance with some examples of the present disclosure.

FIG. 9 depicts an implementation 900 in which the device 102 includes a headset device 902. The headset device 902 includes the one or more microphones 120, the one or more speakers 160, or a combination thereof. Components of the processor 190, including the audio enhancer 192, are integrated in the headset device 902. In a particular example, the audio enhancer 192 operate to enhance user voice activity, which may cause the headset device 902 to perform one or more operations at the headset device 902, to transmit audio data corresponding to the user voice activity to a second device (not shown) for further processing, or a combination thereof. In a particular aspect, the headset device 902 has inputs (e.g., buttons or arrows) that can be used to zoom to different portions of a sound field corresponding to audio output of the headset device 902. For example, the headset device 902 outputs orchestra music and a user wearing the headset device 902 uses the inputs of the headset device 902 to select a particular section or instrument of the orchestra as a zoom target. The audio enhancer 192 generates the one or more output audio signals 138 corresponding to audio zoom operation to the zoom target (e.g., the particular section or the instrument).

Figure 10:
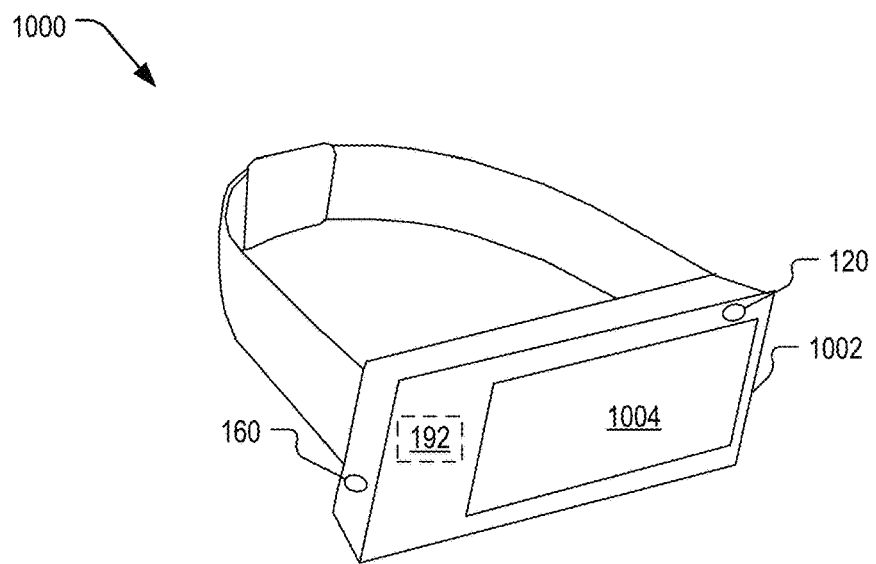
FIG. 10 is a diagram of a wearable electronic device operable to perform psychoacoustic enhancement based on audio source directivity, in accordance with some examples of the present disclosure.

FIG. 10 depicts an implementation 1000 in which the device 102 includes a wearable electronic device 1002, illustrated as a "smart watch." The audio enhancer 192, the one or more microphones 120, the one or more speakers 160, or a combination thereof, are integrated into the wearable electronic device 1002. In a particular example, the audio enhancer 192 operates to enhance user voice activity, which is then processed to perform one or more operations at the wearable electronic device 1002, such as to launch a graphical user interface or otherwise display other information associated with the user's speech at a display screen 1004 of the wearable electronic device 1002. To illustrate, the wearable electronic device 1002 may include a display screen that is configured to display a notification based on user speech enhanced by the wearable electronic device 1002. In a particular example, the wearable electronic device 1002 includes a haptic device that provides a haptic notification (e.g., vibrates) in response to user voice activity. For example, the haptic notification can cause a user to look at the wearable electronic device 1002 to see a displayed notification indicating detection of a keyword spoken by the user. The wearable electronic device 1002 can thus alert a user with a hearing impairment or a user wearing a headset that the user's voice activity is detected. In a particular aspect, the wearable electronic device 1002 includes inputs (e.g., buttons or arrows) that can be used to zoom to different portions of a sound field corresponding to audio output of the wearable electronic device 1002.

FIG. 11 is an implementation 1100 in which the device 102 includes a wireless speaker and voice activated device 1102. The wireless speaker and voice activated device 1102 can have wireless network connectivity and is configured to execute an assistant operation. The one or more processors 190 including the audio enhancer 192, the one or more microphones 120, the one or more speakers 160, or a combination thereof, are included in the wireless speaker and voice activated device 1102. During operation, in response to receiving a verbal command identified as user speech via an audio enhancement operation of the audio enhancer 192, the wireless speaker and voice activated device 1102 can execute assistant operations, such as via execution of a voice activation system (e.g., an integrated assistant application). The assistant operations can include adjusting a temperature, playing music, turning on lights, etc. For example, the assistant operations are performed responsive to receiving a command after a keyword or key phrase (e.g., "hello assistant").

FIG. 12 depicts an implementation 1200 in which the device 102 includes a portable electronic device that corresponds to a camera device 1202. The audio enhancer 192, the one or more microphones 120, the one or more speakers 160, or a combination thereof, are included in the camera device 1202. During operation, in response to receiving a verbal command as enhanced user speech via operation of the audio enhancer 192, the camera device 1202 can execute operations responsive to spoken user commands, such as to perform zoom operations, adjust image or video capture settings, image or video playback settings, or image or video capture instructions, as illustrative examples. In a particular example, the camera device 1202 includes a video camera that, when zooming in on an audio source 184 visible in a viewfinder, causes the audio enhancer 192 to perform an audio zoom operation to enhance audio captured from the audio source 184.

FIG. 13 depicts an implementation 1300 in which the device 102 includes a portable electronic device that corresponds to a virtual reality, augmented reality, or mixed reality headset 1302. The audio enhancer 192, the one or more microphones 120, the one or more speakers 160, or a combination thereof, are integrated into the headset 1302. Audio enhancement can be performed based on audio signals received from the one or more microphones 120 of the headset 1302. In a particular example, audio enhancement can be performed on audio signals corresponding to virtual, augmented, or mixed reality that are received from memory, a network, another device, or a combination thereof. A visual interface device is positioned in front of the user's eyes to enable display of augmented reality or virtual reality images or scenes to the user while the headset 1302 is worn. In a particular example, the visual interface device is configured to display a notification indicating enhanced speech of the audio signal. In a particular implementation, when the user uses the headset 1302 to zoom to a virtual or actual object shown in the visual interface device, the audio enhancer 192 performs an audio zoom of the audio corresponding to the object (e.g., as part of gameplay). In some examples, the audio enhancer 192 performs the audio zoom in conjunction with a visual zoom displayed by the visual interface device.

FIG. 14 depicts an implementation 1400 in which the device 102 corresponds to, or is integrated within, a vehicle 1402, illustrated as a manned or unmanned aerial device (e.g., a package delivery drone). The audio enhancer 192, the one or more microphones 120, the one or more speakers 160, or a combination thereof, are integrated into the vehicle 1402. Audio (e.g., user voice activity) enhancement can be performed based on audio signals received from the one or more microphones 120 of the vehicle 1402, such as for delivery instructions from an authorized user of the vehicle 1402.

FIG. 15 depicts another implementation 1500 in which the device 102 corresponds to, or is integrated within, a vehicle 1502, illustrated as a car. The vehicle 1502 includes the processor 190 including the audio enhancer 192. The vehicle 1502 also includes the one or more microphones 120. Audio (e.g., user voice activity) enhancement can be performed based on audio signals received from the one or more microphones 120 of the vehicle 1502. In some implementations, audio (e.g., voice activity) enhancement can be performed based on an audio signal received from interior microphones (e.g., the one or more microphones 120), such as for a voice command from an authorized passenger. For example, the user voice activity enhancement can be used to enhance a voice command from an operator or a passenger of the vehicle 1502. In some implementations, audio enhancement can be performed based on an audio signal received from external microphones (e.g., the one or more microphones 120), such as sounds from an audio source 184 (e.g., a bird, waves on the beach, outdoor music, an authorized user of the vehicle 1502, a drive-through retail employee, or a curb-side pickup person). In a particular implementation, in response to receiving a verbal command as enhanced user speech via operation of the audio enhancer 192, a voice activation system initiates one or more operations of the vehicle 1502 based on one or more keywords (e.g., "unlock," "start engine," "play music," "display weather forecast," or another voice command) detected in the one or more output audio signals 138, such as by providing feedback or information via a display 1520 or one or more speakers (e.g., a speaker 1510). In a particular implementation, enhanced exterior sounds (e.g., outdoor music, bird sounds, etc.) is played back in the interior of the vehicle 1502 via the one or more speakers 160.

Figure 16:
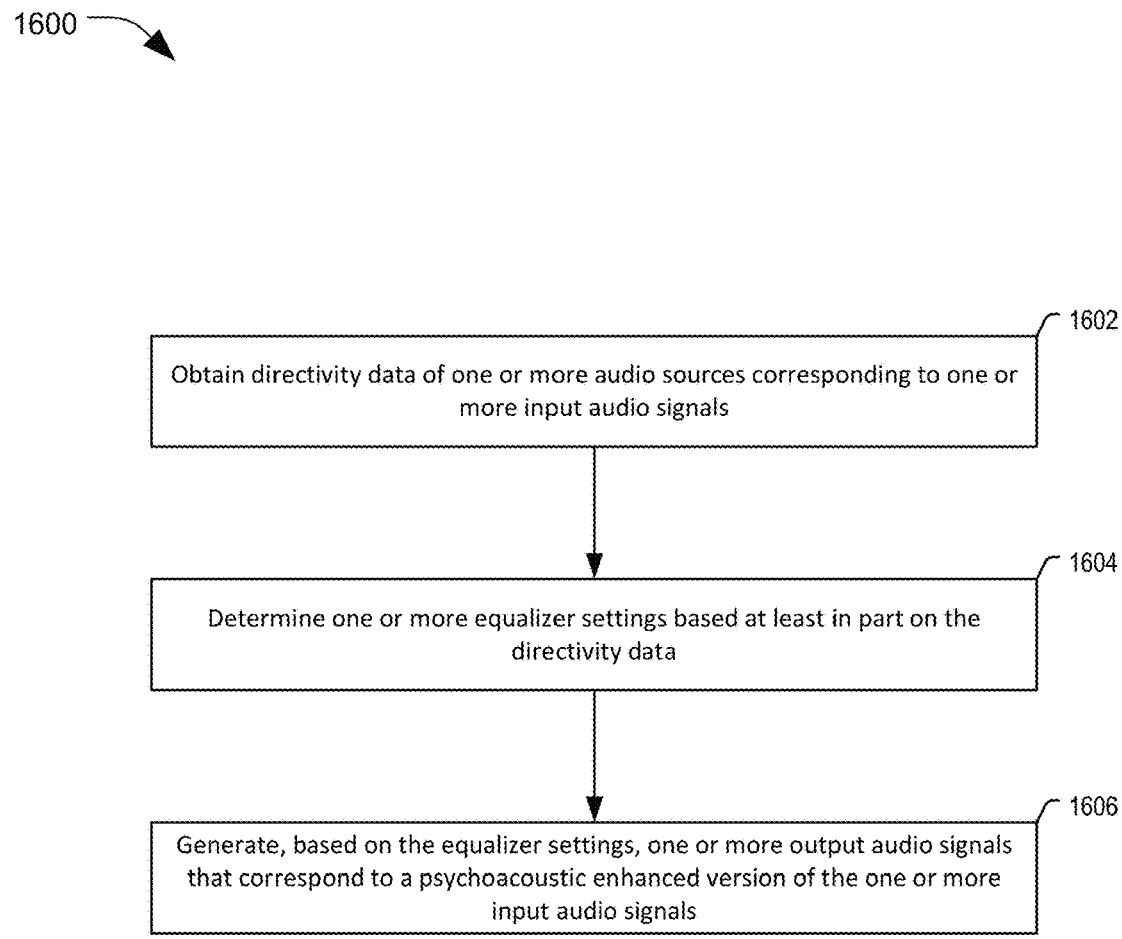
FIG. 16 is diagram of a particular implementation of a method of psychoacoustic enhancement based on audio source directivity that may be performed by the device of FIG. 1, in accordance with some examples of the present disclosure.

Referring to FIG. 16, a particular implementation of a method 1600 of psychoacoustic enhancement based on audio source directivity is shown. In a particular aspect, one or more operations of the method 1600 are performed by at least one of the directivity analyzer 152, the equalizer 148, the audio enhancer 192, the one or more processors 190, the device 102, the system 100 of FIG. 1, or a combination thereof.

The method 1600 includes obtaining directivity data of one or more audio sources corresponding to one or more input audio signals, at 1602. For example, the directivity analyzer 152 of FIG. 1 obtains the directivity data 141 of the audio source 184 corresponding to the one or more input audio signals 126, as described with reference to FIGS. 1 and 4-6.

The method 1600 also includes determining one or more equalizer settings based at least in part on the directivity data, at 1604. For example, the directivity analyzer 152 of FIG. 1 determines the equalizer settings 153 based at least in part on the directivity data 141, as described with reference to FIGS. 1 and 4-6.

The method 1600 further includes generating, based on the equalizer settings, one or more output audio signals that correspond to a psychoacoustic enhanced version of the one or more input audio signals, at 1606. For example, the equalizer 148 of FIG. 1 generates, based on the equalizer settings 153, the one or more output audio signals 138 that correspond to a psychoacoustic enhanced version of the one or more input audio signals 126.

The method 1600 enables generating the one or more output audio signals 138 by adjusting loudness for frequencies based on directivity of the audio source 184. The one or more output audio signals 138 correspond to a more natural sounding audio zoom, e.g., as compared to only adjusting gains of the one or more input audio signals 126.

The method 1600 of FIG. 16 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 1600 of FIG. 16 may be performed by a processor that executes instructions, such as described with reference to FIG. 17.

Referring to FIG. 17, a block diagram of a particular illustrative implementation of a device is depicted and generally designated 1700. In various implementations, the device 1700 may have more or fewer components than illustrated in FIG. 17. In an illustrative implementation, the device 1700 may correspond to the device 102. In an illustrative implementation, the device 1700 may perform one or more operations described with reference to FIGS. 1-16.

In a particular implementation, the device 1700 includes a processor 1706 (e.g., a central processing unit (CPU)). The device 1700 may include one or more additional processors 1710 (e.g., one or more DSPs). In a particular aspect, the one or more processors 190 of FIG. 1 corresponds to the processor 1706, the processors 1710, or a combination thereof. The processors 1710 may include a speech and music coder-decoder (CODEC) 1708 that includes a voice coder ("vocoder") encoder 1736, a vocoder decoder 1738, the audio enhancer 192, or a combination thereof.

The device 1700 may include the memory 132 and a CODEC 1734. The memory 132 may include instructions 1756, that are executable by the one or more additional processors 1710 (or the processor 1706) to implement the functionality described with reference to the audio enhancer 192. The device 1700 may include a modem 1746 coupled, via a transceiver 1750, to an antenna 1752.

The device 1700 may include the display device 162 coupled to a display controller 1726. The one or more speakers 160, the one or more microphones 120, or a combination thereof, may be coupled to the CODEC 1734. For example, the one or more microphones 120 may be coupled via the one or more input interfaces 124 of FIG. 1 to the CODEC 1734. The one or more speakers 160 may be coupled via one or more output interfaces to the CODEC 1734. The CODEC 1734 may include a digital-to-analog converter (DAC) 1702, an analog-to-digital converter (ADC) 1704, or both. In a particular implementation, the CODEC 1734 may receive analog signals from the one or more microphones 120, convert the analog signals to digital signals using the analog-to-digital converter 1704, and provide the digital signals to the speech and music codec 1708. The speech and music codec 1708 may process the digital signals, and the digital signals may further be processed by the audio enhancer 192. In a particular implementation, the speech and music codec 1708 may provide digital signals to the CODEC 1734. The CODEC 1734 may convert the digital signals to analog signals using the digital-to-analog converter 1702 and may provide the analog signals to the one or more speakers 160.

In a particular implementation, the device 1700 may be included in a system-in-package or system-on-chip device 1722. In a particular implementation, the memory 132, the processor 1706, the processors 1710, the display controller 1726, the CODEC 1734, and the modem 1746 are included in a system-in-package or system-on-chip device 1722. In a particular implementation, the input device 130, the camera 140, and a power supply 1744 are coupled to the system-on-chip device 1722. Moreover, in a particular implementation, as illustrated in FIG. 17, the display device 162, the input device 130, the camera 140, the one or more speakers 160, the one or more microphones 120, the antenna 1752, and the power supply 1744 are external to the system-on-chip device 1722. In a particular implementation, each of the display device 162, the input device 130, the camera 140, the one or more speakers 160, the one or more microphones 120, the antenna 1752, and the power supply 1744 may be coupled to a component of the system-on-chip device 1722, such as an interface (e.g., the one or more input interfaces 124, the input interface 144, one or more additional interfaces, or a combination thereof) or a controller.

The device 1700 may include a virtual assistant, a home appliance, a smart device, an internet of things (IoT) device, a communication device, a headset, a vehicle, a computer, a display device, a television, a gaming console, a music player, a radio, a video player, an entertainment unit, a personal media player, a digital video player, a camera, a navigation device, a smart speaker, a speaker bar, a mobile communication device, a smart phone, a cellular phone, a laptop computer, a tablet, a personal digital assistant, a digital video disc (DVD) player, a tuner, an augmented reality headset, a virtual reality headset, an aerial vehicle, a home automation system, a voice-activated device, a wireless speaker and voice activated device, a portable electronic device, a car, a computing device, a virtual reality (VR) device, a base station, a mobile device, or any combination thereof.

In conjunction with the described implementations, an apparatus includes means for obtaining directivity data of one or more audio sources corresponding to one or more input audio signals. For example, the means for obtaining can correspond to the directivity analyzer 152, the audio enhancer 192, the one or more processors 190, the device 102, the system 100 of FIG. 1, the processor 1706, the processors 1710, the modem 1746, the transceiver 1750, the antenna 1752, one or more other circuits or components configured to obtain directivity data of one or more audio sources, or any combination thereof.

The apparatus also includes means for determining one or more equalizer settings based at least in part on the directivity data. For example, the means for determining can correspond to the directivity analyzer 152, the audio enhancer 192, the one or more processors 190, the device 102, the system 100 of FIG. 1, the processor 1706, the processors 1710, one or more other circuits or components configured to determine one or more equalizer settings based at least in part on the directivity data, or any combination thereof.

The apparatus further includes means for generating, based on the equalizer settings, one or more output audio signals that correspond to a psychoacoustic enhanced version of the one or more input audio signals. For example, the means for generating can correspond to the directivity analyzer 152, the audio enhancer 192, the one or more processors 190, the device 102, the system 100 of FIG. 1, the processor 1706, the processors 1710, one or more other circuits or components configured to generate, based on the equalizer settings, one or more output audio signals that correspond to a psychoacoustic enhanced version of the one or more input audio signals, or any combination thereof.

In some implementations, a non-transitory computer-readable medium (e.g., a computer-readable storage device, such as the memory 132) includes instructions (e.g., the instructions 1756) that, when executed by one or more processors (e.g., the one or more processors 1710 or the processor 1706), cause the one or more processors to obtain directivity data (e.g., the directivity data 141) of one or more audio sources (e.g., the audio source 184, the audio source 684, or both) corresponding to one or more input audio signals (e.g., the one or more input audio signals 126). The instructions, when executed by the one or more processors, also cause the one or more processors to determine one or more equalizer settings (e.g., the equalizer settings 153, the equalizer settings 653, or a combination thereof) based at least in part on the directivity data. The instructions, when executed by the one or more processors, also cause the one or more processors to generate, based on the equalizer settings, one or more output audio signals (e.g., the one or more output audio signals 138) that correspond to a psychoacoustic enhanced version of the one or more input audio signals.

Particular aspects of the disclosure are described below in a first set of interrelated clauses:

According to Clause 1, a device includes: one or more processors configured to: obtain directivity data of one or more audio sources corresponding to one or more input audio signals; determine one or more equalizer settings based at least in part on the directivity data; and generate, based on the equalizer settings, one or more output audio signals that correspond to a psychoacoustic enhanced version of the one or more input audio signals.

Clause 2 includes the device of Clause 1, wherein the psychoacoustic enhanced version approximates a frequency response of the one or more audio sources at a zoom orientation and a zoom distance associated with an audio zoom operation.

Clause 3 includes the device of Clause 1 or Clause 2, wherein the one or more processors are further configured to: receive user input indicating a zoom target of an audio zoom operation; and determine the one or more equalizer settings based on the zoom target.

Clause 4 includes the device of Clause 3, wherein the zoom target includes a zoom location, a zoom distance, a zoom orientation, a selection of at least one of the one or more audio sources, or a combination thereof.

Clause 5 includes the device of any of Clause 1 to Clause 4, wherein the directivity data of a particular audio source of the one or more audio sources indicates orientation and distance frequency response characteristics of the particular audio source.

Clause 6 includes the device of any of Clause 1 to Clause 5, wherein the one or more processors are further configured to: perform beamforming on the one or more input audio signals to generate one or more beamformed audio signals; and process an equalizer input audio signal that is based on the one or more beamformed audio signals to generate the one or more output audio signals.

Clause 7 includes the device of any of Clause 1 to Clause 6, wherein the one or more processors are further configured to: identify speech in a speech detection input audio signal that is based on the one or more input audio signals to generate one or more speech audio signals; and process an equalizer input audio signal that is based on the one or more speech audio signals to generate the one or more output audio signals.

Clause 8 includes the device of any of Clause 1 to Clause 7, wherein the one or more processors are further configured to: apply, based on a zoom target, one or more gains to a gain adjuster input audio signal that is based on the one or more input audio signals to generate a gain adjusted audio signal; and process an equalizer input audio signal that is based on the gain adjusted audio signal to generate the one or more output audio signals.

Clause 9 includes the device of any of Clause 1 to Clause 8, wherein the one or more processors are further configured to: perform noise suppression on a noise suppressor input audio signal that is based on the one or more input audio signals to generate a noise suppressed audio signal; and process an equalizer input audio signal that is based on the noise suppressed audio signal to generate the one or more output audio signals.

Clause 10 includes the device of any of Clause 1 to Clause 9, wherein the one or more processors are further configured to: process a context detector input audio signal that is based on the one or more input audio signals to generate context data of the one or more audio sources, wherein the context data of a particular audio source of the one or more audio sources indicates an orientation of the particular audio source, a distance of the particular audio source, a type of the particular audio source, or a combination thereof; and obtain the directivity data of the particular audio source based on the type of the particular audio source.

Clause 11 includes the device of Clause 10, wherein the one or more processors are further configured to generate the context data based at least in part on image data that is associated with the one or more input audio signals.

Clause 12 includes the device of Clause 11, wherein the one or more processors are further configured to retrieve the image data and the one or more input audio signals from memory.

Clause 13 includes the device of Clause 11 or Clause 12, further including: one or more microphones coupled to the one or more processors and configured to generate the one or more input audio signals.

Clause 14 includes the device of any of Clause 11 to Clause 13, further including a camera coupled to the one or more processors and configured to generate the image data.

Clause 15 includes the device of any of Clause 11 to Clause 14, wherein the one or more processors are further configured to perform audio source recognition based on the one or more input audio signals, the image data, or both, to identify the type of the particular audio source of the one or more audio sources.

Clause 16 includes the device of any of Clause 11 to Clause 15, wherein the one or more processors are further configured to: perform audio source recognition based on the one or more input audio signals, the image data, or both, to determine the particular audio source of the one or more audio sources; and perform image analysis on the image data to determine the orientation of the particular audio source.

Clause 17 includes the device of any of Clause 11 to Clause 16, wherein the one or more processors are further configured to: perform audio source recognition based on the one or more input audio signals, the image data, or both, to determine the particular audio source of the one or more audio sources; and perform distance analysis on the one or more input audio signals, the image data, or both, to determine the distance of the particular audio source.

Clause 18 includes the device of any of Clause 10 to Clause 17, wherein the one or more processors are further configured to select the one or more equalizer settings based on equalizer setting data that associates the one or more equalizer settings with the context data, the directivity data, a zoom orientation, a zoom distance, or a combination thereof.

Clause 19 includes the device of Clause 18, wherein the one or more processors are further configured to obtain the equalizer setting data from a memory, another device, or both.

Clause 20 includes the device of any of Clause 10 to Clause 19, wherein the one or more processors are further configured to select the one or more equalizer settings to reduce a frequency response corresponding to mid-frequencies.

Clause 21 includes the device of any of Clause 1 to Clause 20, wherein the one or more processors are further configured to: generate, at a first time, a first sound spectrum of a first input audio signal corresponding to a particular audio source of the one or more audio sources; generate, at a second time, a second sound spectrum of a second input audio signal corresponding to the particular audio source; and update the directivity data to indicate that a difference between a first distance and a first orientation at the first time and a second distance and a second orientation at the second time corresponds to a difference between the first sound spectrum and the second sound spectrum.

Clause 22 includes the device of any of Clause 1 to Clause 21, wherein the one or more processors are further configured to obtain the directivity data from a memory, another device, or both.

Clause 23 includes the device of any of Clause 1 to Clause 5, Clause 21, or Clause 22, wherein the one or more processors are further configured to: perform beamforming on the one or more input audio signals to generate one or more beamformed audio signals; detect speech in the one or more input audio signals to generate one or more speech audio signals; apply, based on a zoom target, one or more gains to the one or more beamformed audio signals, the one or more speech audio signals, or a combination thereof, to generate one or more gain adjusted audio signals; generate, based at least in part on the one or more gain adjusted audio signals, context data of the one or more audio sources, wherein the context data of a particular audio source of the one or more audio sources indicates an orientation of the particular audio source, a distance of the particular audio source, a type of the particular audio source, or a combination thereof; obtain the directivity data of the particular audio source based on the type of the particular audio source; determine the one or more equalizer settings further based on the context data, a zoom orientation, and a zoom distance; apply noise suppression to the one or more gain adjusted audio signals to generate one or more noise suppressed audio signals; and generate the one or more output audio signals by processing the one or more noise suppressed audio signals based on the one or more equalizer settings.

Particular aspects of the disclosure are described below in a second set of interrelated clauses:

According to Clause 24, a method includes: obtaining, at a device, directivity data of one or more audio sources corresponding to one or more input audio signals; determining, at the device, one or more equalizer settings based at least in part on the directivity data; and generating, based on the equalizer settings, one or more output audio signals that correspond to a psychoacoustic enhanced version of the one or more input audio signals.

Clause 25 includes the method of Clause 24 further including: receiving, at the device, user input indicating a zoom target of an audio zoom operation; and determining, at the device, the one or more equalizer settings based on the zoom target, wherein the zoom target includes a zoom location, a zoom distance, a zoom orientation, a selection of at least one of the one or more audio sources, or a combination thereof.

Particular aspects of the disclosure are described below in a third set of interrelated clauses:

According to Clause 26, a non-transitory computer-readable medium stores instructions that, when executed by one or more processors, cause the one or more processors to: obtain directivity data of one or more audio sources corresponding to one or more input audio signals; determine one or more equalizer settings based at least in part on the directivity data; and generate, based on the equalizer settings, one or more output audio signals that correspond to a psychoacoustic enhanced version of the one or more input audio signals.

Clause 27 includes the non-transitory computer-readable medium of Clause 26, wherein the instructions, when executed by the one or more processors, further cause the one or more processors to: perform beamforming on the one or more input audio signals to generate one or more beamformed audio signals; and process an equalizer input audio signal that is based on the one or more beamformed audio signals to generate the one or more output audio signals.

Clause 28 includes the non-transitory computer-readable medium of Clause 26 or Clause 27, wherein the instructions, when executed by the one or more processors, further cause the one or more processors to: identify speech in a speech detection input audio signal that is based on the one or more input audio signals to generate one or more speech audio signals; and process an equalizer input audio signal that is based on the one or more speech audio signals to generate the one or more output audio signals.

Particular aspects of the disclosure are described below in a fourth set of interrelated clauses:

According to Clause 29, an apparatus includes: means for obtaining directivity data of one or more audio sources corresponding to one or more input audio signals; means for determining one or more equalizer settings based at least in part on the directivity data; and means for generating, based on the equalizer settings, one or more output audio signals that correspond to a psychoacoustic enhanced version of the one or more input audio signals.

Clause 30 includes the apparatus of Clause 29, wherein the means for obtaining, the means for determining, and the means for generating are integrated into at least one of a virtual assistant, a home appliance, a smart device, an internet of things (IoT) device, a communication device, a headset, a vehicle, a computer, a display device, a television, a gaming console, a music player, a radio, a video player, an entertainment unit, a personal media player, a digital video player, a camera, or a navigation device.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
one or more processors configured to:
process a signal from a context detector to generate context data of one or more audio sources, wherein the signal is based on one or more input audio signals corresponding to the one or more audio sources, wherein the context data of a particular audio source of the one or more audio sources indicates a type of the particular audio source, and wherein the type of the particular audio source includes one or more of a person, a vehicle, or a combination thereof;
obtain directivity data of the particular audio source of the one or more audio sources based on the type of the particular audio source;
determine one or more equalizer settings based at least in part on the directivity data; and
generate, based on the equalizer settings, one or more output audio signals that correspond to a psychoacoustic enhanced version of the one or more input audio signals.

2. The device of claim 1, wherein the psychoacoustic enhanced version approximates a frequency response of the one or more audio sources at a zoom orientation and a zoom distance associated with an audio zoom operation.

3. The device of claim 1, wherein the one or more processors are further configured to:
receive user input indicating a zoom target of an audio zoom operation; and
determine the one or more equalizer settings based on the zoom target.

4. The device of claim 3, wherein the zoom target includes a zoom location, a zoom distance, a zoom orientation, a selection of at least one of the one or more audio sources, or a combination thereof.

5. The device of claim 1, wherein the directivity data of the particular audio source indicates orientation and distance frequency response characteristics of the particular audio source.

6. The device of claim 1, wherein the one or more processors are further configured to:
perform beamforming on the one or more input audio signals to generate one or more beamformed audio signals; and
process an equalizer input audio signal that is based on the one or more beamformed audio signals to generate the one or more output audio signals.

7. The device of claim 1, wherein the one or more processors are further configured to:
identify speech in a speech detection input audio signal that is based on the one or more input audio signals to generate one or more speech audio signals; and process an equalizer input audio signal that is based on the one or more speech audio signals to generate the one or more output audio signals.

8. The device of claim 1, wherein the one or more processors are further configured to:
apply, based on a zoom target, one or more gains to a gain adjuster input audio signal that is based on the one or more input audio signals to generate a gain adjusted audio signal; and
process an equalizer input audio signal that is based on the gain adjusted audio signal to generate the one or more output audio signals.

9. The device of claim 1, wherein the one or more processors are further configured to:
perform noise suppression on a noise suppressor input audio signal that is based on the one or more input audio signals to generate a noise suppressed audio signal; and
process an equalizer input audio signal that is based on the noise suppressed audio signal to generate the one or more output audio signals.

10. The device of claim 1, wherein the context data of the particular audio source further indicates an orientation of the particular audio source, a distance of the particular audio source, the type of the particular audio source, or a combination thereof, wherein the type of the particular audio source includes one or more of a person, an animal, a bird, a vehicle, a musical instrument, or a combination thereof.

11. The device of claim 1, wherein the one or more processors are further configured to generate the context data based at least in part on image data that is associated with the one or more input audio signals.

12. The device of claim 11, wherein the one or more processors are further configured to retrieve the image data and the one or more input audio signals from memory.

13. The device of claim 11, further comprising one or more microphones coupled to the one or more processors and configured to generate the one or more input audio signals.

14. The device of claim 11, further comprising a camera coupled to the one or more processors and configured to generate the image data.

15. The device of claim 11, wherein the one or more processors are further configured to perform audio source recognition based on the one or more input audio signals, the image data, or both, to identify the type of the particular audio source of the one or more audio sources.

16. The device of claim 11, wherein the one or more processors are further configured to:
perform audio source recognition based on the one or more input audio signals, the image data, or both, to determine the particular audio source of the one or more audio sources; and
perform image analysis on the image data to determine an orientation of the particular audio source.

17. The device of claim 11, wherein the one or more processors are further configured to:
perform audio source recognition based on the one or more input audio signals, the image data, or both, to determine the particular audio source of the one or more audio sources; and
perform distance analysis on the one or more input audio signals, the image data, or both, to determine the distance of the particular audio source.

18. The device of claim 1, wherein the one or more processors are further configured to select the one or more equalizer settings based on equalizer setting data that associates the one or more equalizer settings with the context data, the directivity data, a zoom orientation, a zoom distance, or a combination thereof.

19. The device of claim 18, wherein the one or more processors are further configured to obtain the equalizer setting data from a memory of the device, another device, or both.

20. The device of claim 1, wherein the one or more processors are further configured to select the one or more equalizer settings to reduce a frequency response corresponding to mid-frequencies.

21. The device of claim 1, wherein the one or more processors are further configured to:
generate, at a first time, a first sound spectrum of a first input audio signal corresponding to the particular audio source of the one or more audio sources;
generate, at a second time, a second sound spectrum of a second input audio signal corresponding to the particular audio source; and
update the directivity data to indicate that a difference between a first distance and a first orientation at the first time and a second distance and a second orientation at the second time corresponds to a difference between the first sound spectrum and the second sound spectrum.

22. The device of claim 1, wherein the one or more processors are further configured to obtain the directivity data from a memory of the device, another device, or both.

23. The device of claim 1, wherein the one or more processors are further configured to:
perform beamforming on the one or more input audio signals to generate one or more beamformed audio signals;
detect speech in the one or more input audio signals to generate one or more speech audio signals;
apply, based on a zoom target, one or more gains to the one or more beamformed audio signals, the one or more speech audio signals, or a combination thereof, to generate one or more gain adjusted audio signals;
generate, based at least in part on the one or more gain adjusted audio signals, context data of the one or more audio sources, wherein the context data of the particular audio source of the one or more audio sources indicates an orientation of the particular audio source, a distance of the particular audio source, the type of the particular audio source, or a combination thereof;
determine the one or more equalizer settings further based on the context data, a zoom orientation, and a zoom distance;
apply noise suppression to the one or more gain adjusted audio signals to generate one or more noise suppressed audio signals; and
generate the one or more output audio signals by processing the one or more noise suppressed audio signals based on the one or more equalizer settings.

24. A method comprising:
processing, at a device, a signal from a context detector to generate context data of one or more audio sources, wherein the signal is based on one or more input audio signals corresponding to the one or more audio sources, wherein the context data of a particular audio source of the one or more audio sources indicates a type of the particular audio source, and wherein the type of the particular audio source includes one or more of a person, a vehicle, or a combination thereof;
obtaining, at the device, directivity data of the particular audio source based on the type of the particular audio source;

determining, at the device, one or more equalizer settings based at least in part on the directivity data; and generating, based on the equalizer settings, one or more output audio signals that correspond to a psychoacoustic enhanced version of the one or more input audio signals.

25. The method of claim 24 further comprising:

receiving, at the device, user input indicating a zoom target of an audio zoom operation; and determining, at the device, the one or more equalizer settings based on the zoom target, wherein the zoom target includes a zoom location, a zoom distance, a zoom orientation, a selection of at least one of the one or more audio sources, or a combination thereof.

26. A non-transitory computer-readable medium storing instructions that, when executed by one or more processors, cause the one or more processors to:

process a signal from a context detector to generate context data of one or more audio sources, wherein the signal is based on one or more input audio signals corresponding to the one or more audio sources, wherein the context data of a particular audio source of the one or more audio sources indicates a type of the particular audio source, and wherein the type of the particular audio source includes one or more of a person, a vehicle, or a combination thereof;

obtain directivity data of the particular audio source based on the type of the particular audio source;

determine one or more equalizer settings based at least in part on the directivity data; and generate, based on the equalizer settings, one or more output audio signals that correspond to a psychoacoustic enhanced version of the one or more input audio signals.

27. The non-transitory computer-readable medium of claim 26, wherein the instructions, when executed by the one or more processors, further cause the one or more processors to:

perform beamforming on the one or more input audio signals to generate one or more beamformed audio signals; and process an equalizer input audio signal that is based on the one or more beamformed audio signals to generate the one or more output audio signals.

28. The non-transitory computer-readable medium of claim 26, wherein the instructions, when executed by the one or more processors, further cause the one or more processors to:

identify speech in a speech detection input audio signal that is based on the one or more input audio signals to generate one or more speech audio signals; and process an equalizer input audio signal that is based on the one or more speech audio signals to generate the one or more output audio signals.

29. An apparatus comprising:

means for processing a signal from a context detector to generate context data of one or more audio sources, wherein the signal is based on one or more input audio signals corresponding to the one or more audio sources, wherein the context data of a particular audio source of the one or more audio sources indicates a type of the particular audio source, and wherein the type of the particular audio source includes one or more of a person, a vehicle, or a combination thereof;

means for obtaining directivity data of the particular audio source based on the type of the particular audio source;

means for determining one or more equalizer settings based at least in part on the directivity data; and means for generating, based on the equalizer settings, one or more output audio signals that correspond to a psychoacoustic enhanced version of the one or more input audio signals.

30. The apparatus of claim 29, wherein the means for obtaining, the means for determining, and the means for generating are integrated into at least one of a virtual assistant, a home appliance, a smart device, an internet of things (IoT) device, a communication device, a headset, a vehicle, a computer, a display device, a television, a gaming console, a music player, a radio, a video player, an entertainment unit, a personal media player, a digital video player, a camera, or a navigation device.

* * * * *